US012711796B2

(12) United States Patent
Hussain et al.

(10) Patent No.: US 12,711,796 B2
(45) Date of Patent: Aug. 18, 2026

(54) AUTOMATIC MACHINE LEARNING DRIVEN COMPLIANCE CLASSIFICATION AND DETERMINATION

(71) Applicant: ADP, Inc., Roseland, NJ (US)

(72) Inventors: Mohammed Hussain, Atlanta, GA (US); Rajarajeswari Balasubramaniyan, Dunwoody, GA (US); Xueming Zheng, Toronto (CA)

(73) Assignee: ADP, Inc., Roseland, NJ (US)

( * ) Notice: Subject to any disclaimer, the term of this patent is extended or adjusted under 35 U.S.C. 154(b) by 354 days.

(21) Appl. No.: 18/593,535

(22) Filed: Mar. 1, 2024

(65) Prior Publication Data

US 2025/0278953 A1 Sep. 4, 2025

(51) Int. Cl.

*G06V 30/41* (2022.01)
*G06T 7/00* (2017.01)
*G06V 10/70* (2022.01)
*G06V 30/42* (2022.01)

(52) U.S. Cl.

CPC ............ *G06V 30/41* (2022.01); *G06T 7/0002* (2013.01); *G06V 10/87* (2022.01); *G06V 30/42* (2022.01)

(58) Field of Classification Search

CPC ........ G06V 30/41; G06V 10/87; G06V 30/42; G06V 30/412; G06T 7/0002

See application file for complete search history.

(56) References Cited

U.S. PATENT DOCUMENTS 11,475,158 B1 * 10/2022 Zhang ................. G06F 21/6245
11,694,034 B2 * 7/2023 Yang ....................... G06F 40/30 704/9
12,182,524 B2 * 12/2024 Zhang ..................... G06F 40/30
12,417,239 B2 * 9/2025 Kurshan ................. G06F 40/30
12,494,077 B1 * 12/2025 Tang ..................... G06F 40/284
2015/0088888 A1 * 3/2015 Brennan ............... G06F 16/285 707/737
2023/0401386 A1 * 12/2023 Wang ...................... G06F 16/35

* cited by examiner

*Primary Examiner* — Tom Y Lu
(74) *Attorney, Agent, or Firm* — Foley & Lardner LLP

(57) ABSTRACT

Automatic compliance using custom integrated machine learning is provided. For example, a system integrates one or more processors, coupled with memory, to receive a data file including digital images corresponding to statements. The system determines, using a text classification model, a type of the statements. The system identifies a section identification model relating to the type of the statements and annotated statements with labeled sections. The system determines, using the section identification model, a location and a label of a section in a first digital image corresponding to a first statement. The system extracts, based on the location and the label of the section, information from the first digital image. The system detects, based on a comparison of the extracted information with threshold information established for the label, a non-compliance with a procedure. The system performs an action responsive to detection of the non-compliance with the procedure.

20 Claims, 11 Drawing Sheets

500

600

| Earnings | Hours | Rate | Current | YTD |
|---|---|---|---|---|
| REGULAR | 79.70 | 17.2921 | 1,378.18 | 20,129.08 |
| OT HOURS | 5.59 | 25.9381 | 144.99 | 2,560.75 |
| DT HOURS | | | .00 | 374.28 |
| VACATION | | | .00 | 1,042.18 |
| SICK | | | .00 | 679.14 |
| HOLIDAY | | | .00 | 683.54 |
| CA MEAL PENA | 4.00 | 17.2921 | 69.17 | 2,543.32 |
| CA REST PENA | | | .00 | 172.92 |
| TOTAL PAY | | | 1,592.34 | 28,185.21 |

| Accrual Summary | Balance |
|---|---|
| PTO/Vacation | 236.63 |
| LTI/Sick | 4.42 |
| Floating Hol | |
| Supp Sick | 80.00 |

| Deductions | Current | YTD |
|---|---|---|
| **Tax Deductions** | | |
| FEDERAL TAX | 114.24 | 815.53 |
| FICA TAX | 114.63 | 2,040.21 |
| STATE TAX -CA | 32.04 | 691.78 |
| DISABILITY TAX | 17.98 | 306.33 |
| Total Taxes | 278.89 | 3,853.85 |
| **Deductions** | | |
| PRETAX MEDICAL | 82.80 | 1,324.80 |
| PRETAX DENTAL | 7.70 | 123.20 |
| PRE TAX VISION | 3.39 | 67.80 |
| DIR DEP/PAY CARD | 1,219.56 | 22,815.56 |
| Total Deductions | 1,313.45 | 24,331.36 |
| Net Pay | 1,219.56 | |

| pdf_name | pdf_page | Period Beginning | Period Ending | Pay Date | Policy | Probability of mapping to sick | Probability of mapping to pto | Probability of mapping to other sick | Probability of mapping to other pto | Probability of mapping to unlimited | Probability of mapping to total hrs worked | Probability of mapping to unknown |
|---|---|---|---|---|---|---|---|---|---|---|---|---|
| 2020_29.pdf | 1 | 06/26/2020 | 07/12/2020 | 07/15/2020 | Adp 4k Match | 0 | 0 | 0 | 0.037938 | 0.002082 | 0.000487 | 0.959493 |
| 2020_29.pdf | 1 | 06/26/2020 | 07/12/2020 | 07/15/2020 | Eligib Earns | 0.022448441 | 0 | 0.061697 | 0 | 0.016053 | 0 | 0.894203 |
| 2020_29.pdf | 1 | 06/26/2020 | 07/12/2020 | 07/15/2020 | Pto Balance | 0 | 0.908597 | 0 | 0.054076 | 0 | 0 | 0.037327 |
| 2020_29.pdf | 1 | 06/26/2020 | 07/12/2020 | 07/15/2020 | 401K | 0.029722113 | 0.039191 | 0 | 0 | 0.008943 | 0.004176 | 0.908971 |

FIG. 7

AUTOMATIC MACHINE LEARNING DRIVEN COMPLIANCE CLASSIFICATION AND DETERMINATION

TECHNICAL FIELD

This application is generally related to computing technology, and particularly to detection of data compliance using machine learning to improve computing performance.

BACKGROUND

Heterogeneous computing systems can store, retrieve, and process different types of data across different systems. Compliance determinations are performed in high volumes on large data files. Due to the high volume of data for which compliance is determined, compliance determinations are error prone and cause systematic problems including latency, traffic congestion, or delay. Poor compliance determination can be a source of operational errors, resulting in wasted or unnecessary computing resource utilization, or the introduction of delays or latency in electronic transactions.

SUMMARY

Technical solutions described herein facilitate automatic compliance using custom integrated machine learning models. For example, aspects of the technical solutions described herein identify, classify, and extract information from a data file to determine compliance with a procedure, and validate the data file. Some aspects of the technical solutions facilitate identifying non-compliant portions from the data file to ensure compliance.

These compliance determinations can cause latency, error, traffic congestion, or delay across a system including the client devices and computing systems due to the size of the data file variety of formats, and intricacies of the data file. Furthermore, compliance determinations can be prone to error and are not easily extensible to new types of data files. Due to the large volume of data files with differing formats and information, and scale of the heterogenous computing systems, it can be challenging to extract information from different data files and map the information to a procedure to determine compliance without excessive latency, inaccuracy, or generating erroneous computing actions. These technical challenges further prevent one or more client devices from receiving extracted and standardized data due to extensive network traffic and reduced throughput, thereby affecting the efficiency of the system overall or being computationally expensive. Here, "computationally expensive" indicates that the computational costs used for the retrieval of the data file for the information extraction being above certain predetermined thresholds. Computational costs can include factors such as network bandwidth, time, memory, electric power, and processing power, etc. The computational cost can also be indicated in terms of computations being performed, for example, number of floating point operations (FLOPs), and/or as number of multiply-and-accumulate operations (MACs or MACCs), etc.

Technical solutions are provided herein to address such technical challenges. For example, aspects of the technical solutions described herein can be directed to determining whether a data file complies with a procedure using one or more machine learning models. To do so, aspects of this technology can convert a first type of data file in a first format to a second format (e.g., digitizing a scanned image), which can be technically challenging due to the variations in the formats or types of the data file, or other content in the data file. For example, the data file can include multiple digital images, and each image can correspond to a pay statement or even multiple pay statements. The data file can be received from a variety of computing systems in a variety of formats. To convert the data file from one format to another, aspects of the technical solutions described herein can use one or more models trained with machine learning to determine a respective type of each of the statements. The one or more machine learning models can facilitate identifying sections and geographic locations associated with the data file.

The technical solutions facilitate use of trained machine learning models to identify, extract, and map data from a data file to a procedure and determine a compliance with the procedure. The technical solutions described herein facilitate extracting information from a variety of different data files that may be in different formats and may be received from disparate sources. In some aspects of the technical solutions described herein, the data files may include data configured using different formats. For example, two data files may vary in arrangement of values within each data file among other factors. The technical solutions described herein identify different identifiers of the data file, such as a data type, vendor type, or file type, among others. Based on the identifiers, the locations of different information within the data file are estimated. The technical solutions described herein extract, using one or more of the machine learning models, content from one or more of the locations within the data file. In some aspects, a location is specified using coordinates. The location can be specified by defining bounding boxes around content at that location. The technical solutions described herein identify a procedure associated with the extracted content. Further, it is determined whether the extracted content (or a portion thereof) complies with the identified procedure. Furthermore, the technical solutions described herein can generate a report identifying compliance or non-compliance with the procedure at different portions of the data file and/or for multiple data files. Thus, by determining locations of information and content of the information within data files using trained machine learning model(s), the technical solutions described herein reduce computational cost (e.g., latency, network bandwidth, congestion, time, memory, electric power, processing power, FLOPs, MACs or MACCs) associated with determining compliance of a data file by a computing system compared to previous compliance systems. Accordingly, the technical solutions described herein are rooted in computing technology, and provide improvements to computing technology, particularly systems that enhance the performance of computing technology through automatic extraction of information from data files, detection of compliance of content in data files, and implementation of compliance assurance mechanisms of the content.

At least one aspect of the technical solutions described herein is directed to a system. The system includes one or more processors, coupled with memory. The one or more processors receive a data file. The data file includes a respective set of digital images respectively corresponding to a set of statements. The one or more processors determine, using one or more machine learning models, a type of a first pay statement in the data file. The one or more processors identify a section identification model trained with machine learning relating to annotated statements with labeled sections for the type of the first pay statement. The one or more processors determine, using the section identification model, a location and a label of a predetermined section in a first digital image of the first pay statement based on the type of the first pay statement. The one or more processors extract, based on the location and the label of the predetermined section, information from the first digital image. The one or more processors detect, based on a comparison of the extracted information with threshold information established for the label, a non-compliance with a procedure. The one or more processors perform an action responsive to detection of the non-compliance with the procedure.

In some aspects of the technical solutions described herein, to determine the location, the one or more processors determine coordinates in the first digital image corresponding to the predetermined section. The one or more processors construct a data structure including the extracted information from the first digital image. The one or more processors annotate the extracted information in the data structure with the label. In some aspects of the technical solutions described herein, to extract the information, the one or more processors use a support vector machine to identify a column in the predetermined section. The one or more processors extract the information based on the identified column. In some aspects of the technical solutions described herein, to detect the non-compliance, the one or more processors detect an erroneous value in the extracted information.

In some aspects of the technical solutions described herein, to detect the non-compliance, the one or more processors determine a missing value in the extracted information. In some aspects of the technical solutions described herein, the one or more processors extract second information from a second section at a second location in the first image having a second label. The one or more processors determine the non-compliance based on the extracted second information.

In some aspects of the technical solutions described herein, to detect the non-compliance, the one or more processors select the threshold information for the procedure based on the type of the set of statements and a geographic location relating to the first statement. In some aspects of the technical solutions described herein, to detect the non-compliance, the one or more processors select the threshold information for the procedure based on at least one of a date of the first statement, a region code of the first statement, or a company code of the first statement. In some aspects of the technical solutions described herein, the one or more processors provide, for display, a notification of the non-compliance. In some aspects of the technical solutions described herein, to perform the action, the one or more processors generate a spreadsheet comprising an indication of the first statement or the predetermined section with the non-compliance.

At least one aspect of the technical solution described herein is directed to a method. The method includes receiving, by one or more processors coupled with memory, a data file. The data files include a respective set of digital images corresponding to a set of statements. The method includes determining, by the one or more processors, using one or more machine learning models, a type of the set of statements. The method includes identifying, by the one or more processors, a section identification model trained with machine learning relating to the type of the set of statements and annotated statements with labeled sections. The method includes determining, by the one or more processors using the section identification model, a location and a label of a predetermined section in a first digital image of the set of digital images corresponding to a first statement of the set of statements. The method includes extracting, by the one or more processors based on the location and the label of the predetermined section, information from the first digital image. The method includes detecting, by the one or more processors, based on a comparison of the extracted information with threshold information established for the label, a non-compliance with a procedure. The method includes performing, by the one or more processors, an action responsive to detection of the non-compliance with the procedure.

In some aspects of the technical solutions described herein, determining the location includes determining, by the one or more processors, coordinates in the first digital image corresponding to the predetermined section. In some aspects of the technical solutions described herein, the method includes constructing, by the one or more processors, a data structure. The data structure includes the extracted information from the first digital image. In some aspects of the technical solutions described herein, the method includes annotating, by the one or more processors, the extracted information in the data structure with the label. In some aspects of the technical solutions described herein, detecting the non-compliance includes determining, by the one or more processors, a missing value in the extracted information.

In some aspects of the technical solutions described herein, detecting the non-compliance includes selecting, by the one or more processors, the threshold information for the procedure based on the type of the set of statements and a geographic location relating to the first statement. In some aspects of the technical solutions described herein, the method includes generating, by the one or more processors, a metric indicative of a level of compatibility of the set of statements.

At least one aspect of the technical solutions described here is directed to a non-transitory computer-readable medium. The non-transitory computer readable medium includes instructions to cause a processor to receive a data file. The data file includes a respective set of digital images corresponding to a set of statements. The instructions cause the processor to determine, using one or more machine learning models, a type of the set of statements. The instructions cause the processor to determine, using a section identification model, a location and a label of a section in a first digital image of the set of digital images that corresponds to a first statement of the set of statements. The instructions cause the processor to extract, based on the location and the label of the section, information from the first digital image. The instructions cause the processor to detect, based on a comparison of the extracted information with threshold information established for the label, a non-compliance with a procedure. The instructions cause the processor to perform an action responsive to detection of the non-compliance with the procedure.

In some aspects of the technical solutions described herein, the instructions cause the processor to determine coordinates in the first digital image corresponding to the section.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. The foregoing information and the following detailed description and drawings include illustrative examples and should not be considered as limiting.

BRIEF DESCRIPTION OF THE DRAWINGS

Aspects of the technical solutions are described in the detailed description which follows, in reference to the noted plurality of drawings by way of non-limiting examples of exemplary embodiments of the technical solutions described herein.

FIG. 6 depicts an example data file, according to one or more aspects of the technical solutions described herein.

FIG. 7 depicts an example spreadsheet, according to one or more aspects of the technical solutions described herein.

DETAILED DESCRIPTION OF ASPECTS OF THE INVENTION

Figure 1:
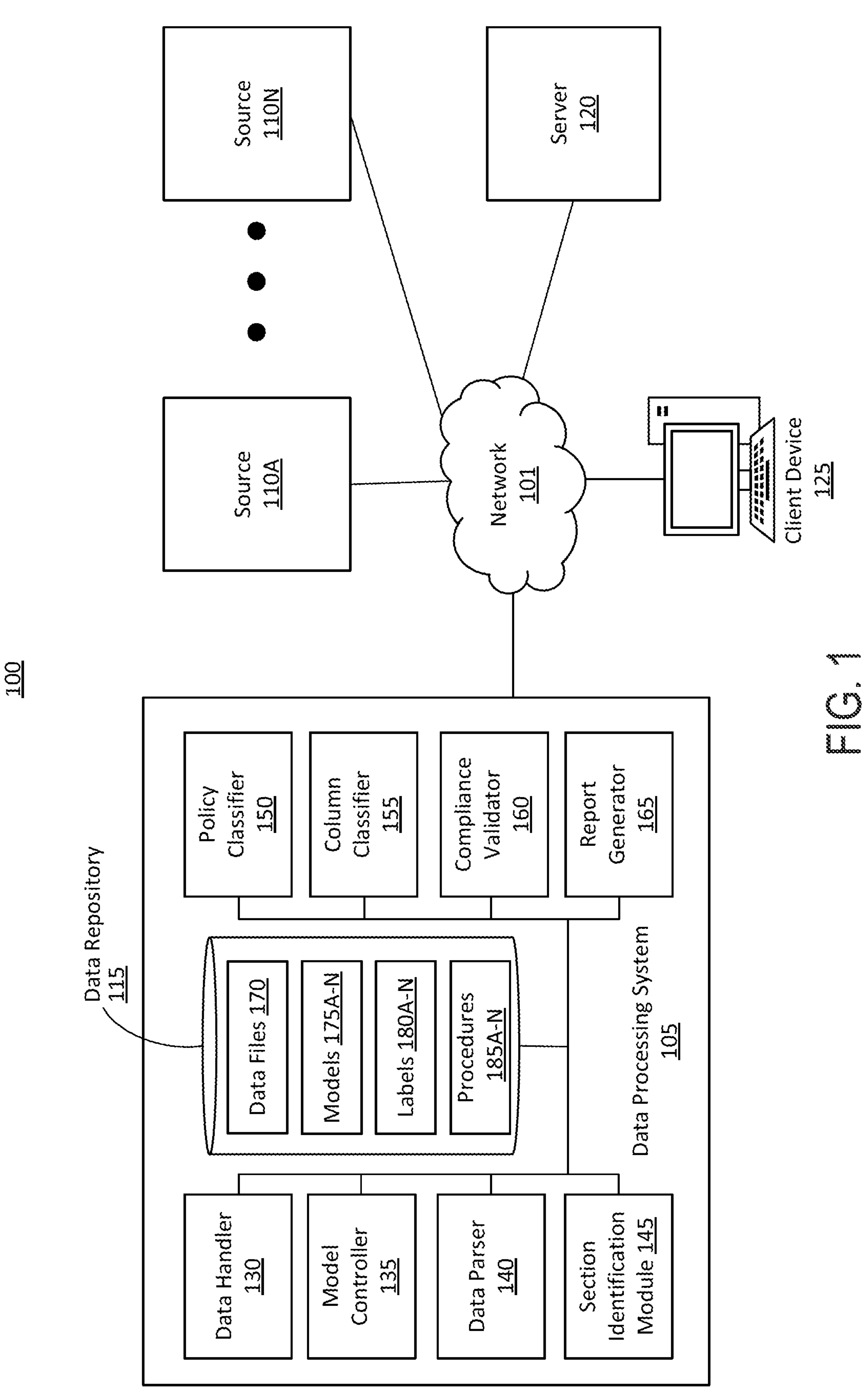
FIG. 1 depicts an example system of automatic compliance via custom integrated machine learning models.

Following below are more detailed descriptions of various concepts related to, and implementations of, methods, apparatuses, and systems to facilitate automatic compliance using custom integrated machine learning models. The various concepts introduced above and discussed in greater detail below can be implemented in any of numerous ways.

Aspects of the technical solutions described herein are directed to a system, method, and computer readable medium to extract data and automatically determine procedural compliance. Aspects of the technical solutions described herein are generally directed to automatic compliance using custom integrated machine learning models. For example, the technical solutions receive a data file. The data file can include multiple images. The technical solutions extract information from the images to map to a procedure to determine compliance of the data file to the procedure. In some aspects, data file is transferred from one system to another. The data file may not conform to a format processable by the other system. Extracting information from the data file to determine compliance to a procedure is tedious due to the size of the data file, the number of images within the data file, and differing formats of data file. Determining compliance for the data file uses large amounts of computational resources and is prone to error. Individually the analyzing data file to determine compliance can use advanced processors. These computing systems utilize large amounts of energy due to operation of the processors and cooling of the systems. These computing systems perform continuous read/write calls to databases for accessing data file. The continuous read/write calls can be monotonous and highly prone to error due to the quantity and size of packet transfers containing the data file. Furthermore, in the event the process can be streamlined for a specific data file, the changing format of the data file from different sources may not be extensible to another data file. Accordingly, checking compliance of multiple (in some cases multitude) of such data files has several technical challenges. Technical solutions described herein address such technical challenges.

The technical solutions described herein overcome these challenges by utilizing trained machine learning models to extract information from the data file and identify and/or define locations of the information within the data file. Furthermore, using the trained machine learning models and the extracted information and locations, the technical solutions described herein determine whether the data file adheres to a procedure. Upon determination of the data file being compatible or incompatible with the procedure, the technical solutions described herein generate a report indicating one or more of compliance of the data file or the information extracted from the data file. By extracting the information, mapping the information to locations, and identifying a corresponding procedure for the data file, determining compliance of the data file to the procedure is streamlined, thereby reducing processing power and resources when compared with compliance systems which do not utilize these trained machine learning models.

FIG. 1 depicts an example system 100 that facilitates automatic compliance using custom integrated machine learning models according to one or more aspects of the technical solutions described herein. The system 100 includes a computing system 105, a client device 125 (sometimes hereinafter referred to as the client(s) 125, the client device(s) 125, or the client service(s) 125), a plurality of sources 110A-N (sometimes hereinafter referred to as the source(s) 110), a server 120, and a network 101. The computing system 105 includes a data handler 130, a model controller 135, a data parser 140, a section identification module 145, a policy classifier 150, a column classifier 155, a compliance validator 160, a report generator 165, and a data repository 115. The data handler 130, the model controller 135, the data parser 140, the section identification module 145, the policy classifier 150, the column classifier 155, the compliance validator 160, the report generator 165, and the data repository 115 each communicates with the client device 125, the sources 110, or the server 120 via the network 101.

The data repository 115 is any memory, storage, or cache for storing information or data structures of the system 100. The data repository 115 contains data used by the system 100 and allows that data to be accessed by any components of the system 100, such as by communication methods described herein. The data repository 115 contains at least a data file 170, models 175A-N (sometimes hereinafter referred to as the model(s) 175 or the machine learning model(s) 175), the labels 180A-N (sometimes hereinafter referred to as the label(s) 180), and procedures 185A-N (sometimes hereinafter referred to as the procedure(s) 185) among others. The information in the data repository 115 is stored in any kind of memory, such as a cloud or hard drive. The data repository 115 includes, for example, random access memory (RAM), dynamic random access memory (DRAM), static random access memory (SRAM), error-correcting code (ECC), read only memory (ROM), programmable read only memory (PROM), or electrically erasable read only memory (EEPROM). In some aspects, the information or data structures (e.g., tables, images, lists, spreadsheets, etc.) contained within the data repository 115 are dynamic and change periodically (e.g., daily or every millisecond); via an input from a user (e.g., a user operating the client device 125); via information from the client 125, the source 110, or the server 120 transmitted through the network 101; via inputs from subcomponents of the computing system 105 (e.g., the data handler 130 or the compliance validator 160), or via an external update to the system 100. For example, the models 175 within the data repository 115 change or are updated responsive to an indication from the model controller 135.

The source 110 is or includes a system or computing device that stores the data file 170 or the procedures 185. The source 110 is or includes a storage or data repository to store the data file 170 or the procedures 185. In some aspects of the technical solutions described herein, the source 110 is maintained, owned, or operated by the same entity as an entity maintaining, owning, or operating the computing system 105. In some aspects, the source 110 is located remotely from the computing system 105. For example, the source 110 is maintained by an outside entity such as a government, individual, company, or non-profit organization. In some aspects of the technical solutions described herein, the source 110 is accessed by approved computing systems, such as the computing system 105 operating under the same entity as the source 110. In some aspects, the source 110 includes or corresponds to other computing devices operating an electronic transaction system. The electronic transaction system can be an application or system operating on the client device 125 for maintaining the data file 170. Examples of the electronic transaction system can include a system for running a payroll for a company, onboarding new employees, maintaining tax or accounting information, operating financial transfers such as payment to an employee or depositing in a bank account, transferring assets or information such as through a library or research database, maintaining medical records, maintaining legal records, or any other system or application in which data file 170 is manipulated or maintained. For example, the source 110A can be an external computing system maintaining a database of pay statements for an entity and the source 110B can be another external computing system maintaining a database of procedures for a particular country. In this example, the pay statements of the source 110A can be one or more data files 170.

Figure 5:
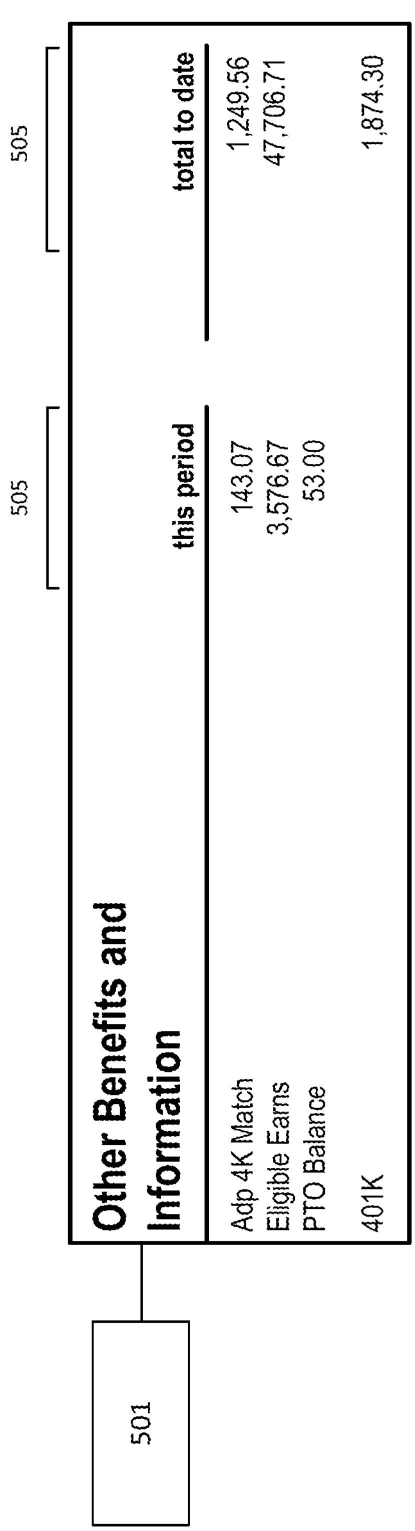
FIG. 5 depicts an example data file, according to one or more aspects of the technical solutions described herein.

The source 110 maintains, includes, stores, or otherwise hosts the data file 170. An illustrative example of a data file 170 is depicted in FIG. 5. For example, the data file 170 can include information about more entities. The data file 170 can be an image or include one or more digital images. The data file 170 can include a plurality of values. The data file 170 can include different attributes, such as a file type, data type, vendor type, or other such attributes.

In some aspects, the data file 170 corresponds to one or more procedures 185. The one or more procedures 185 are parameters for determining compliance of the data file 170. The procedures 185 used to determine compliance of the data file 170 vary based on attributes of the data file 170, such as information contained within the data file 170, labels 180 of the data file 170, a type of the data file 170 (e.g., vendor type, data type, etc.), among others. For example, the procedures 185 relate to a geographic location corresponding to statements associated with the images of the data file 170, a type of the statements of the data file 170, a period of time (e.g., a date, a range of time, etc.), among others. In some aspects, a digital image corresponding to a statement is subject to regulations regarding the information presented or processed within the statement. In some aspects, the statement is a pay statement corresponding to an employee, a bill of materials (e.g., for construction or procurement), a contract, a check, an explanation of benefits (EOB), a summary of benefits and coverage, among others.

In some aspects, the procedure 185 relates to information within each digital image associated with a statement corresponding to regulations, such as local, state, or federal regulations for presentation of images. The digital image can correspond to the statement is subject to procedures 185 implemented by an entity associated with the pay statements, such as procedures 185 related to the information displayed or processed within a pay statement for an employee of the entity or information within a summary of benefits and coverage for an individual insured by an entity, among other examples. Therefore, it may be desirable to ensure that the information contained within the digital image (of a data file 170 of multiple digital images) corresponding to an employee comports with the procedures 185 for a geographic region, type, time period, etc. For example, a first employee working in California but living in Nevada may be subject to different procedures 185 for the display or processing of the information included within the first employee's pay statement than a second employee living and working in Nevada. In this example, the data file 170 includes the pay statements of the first and second employees as digital images corresponding to each respective pay statement and may include other digital images corresponding to pay statements for respective employees of an entity. As another illustrative example, an EOB for a self-insured individual may differ from an EOB for an individual insured by a company or an individual insured by Medicare.

In some aspects, the data file 170 is an input to the one or more models 175. The models 175 are machine learning models trained to accept inputs to determine one or more outputs. In some aspects, one or more models of the models 175 accept the same inputs, different inputs, or a combination of overlapping and non-overlapping inputs for input to the same or different of the models 175. In some cases, the models 175 include overlapping models, in some cases the models 175 include exclusive models, and in some cases the models 175 include a combination thereof. A first overlapping model 175 undergoes different training, accepts different inputs, or produces a different outcome from a second overlapping model 175, while employing the same underlying algorithm. For example, a first model 175A containing a first machine learning algorithm accepts the images of the data file 170 as input, and a second model 175B containing the first machine learning algorithm accepts the images of the data file 170 as input. In this illustrative example, the first machine learning model 175A produces a different outcome than the second machine learning model 175B, despite each model containing the same machine learning algorithm, due to differences in training each model.

The machine learning models 175 include machine learning algorithms, equations, calculations, or models trained to determine an outcome based on an input. In some aspects, the models 175 include neural networks, decision-making models, linear regression models, random forests, classification models, reinforcement learning models, clustering models, neighbor models, decision trees, probabilistic models, classifier models, or other such models. For example, the models 175 include natural language processing (e.g., support vector machine (SVM), Bag of Words, Counter vector, Word2Vec, k-nearest neighbors (KNN) classification, long short term memory (LSTM)), object detection and image identification models (e.g., mask region-based convolutional neural network (R-CNN), CNN, single-shot detector (SSD), deep learning CNN with Modified National Institute of Standards and Technology (MNIST), RNN based long short term memory (LSTM), Hidden Markov Models, You Only Look Once (YOLO), LayoutLM), classification ad clustering models (e.g., random forest, XGBoost, k-means clustering, DBScan, isolation forests, segmented regression, sum of subsets 0/1 Knapsack, Backtracking, Time series, transferable contextual bandit) or other models such as named entity recognition, Saccharomyces Genome Database (SGD), term frequency-inverse document frequency (TF-IDF), stochastic gradient descent, Naïve Bayes Classifier, cosine similarity, multi-layer perceptron, sentence transformer, date parser, conditional random field model, Bidirectional Encoder Representations from Transformers (BERT), Elmo, fastText, XLNet, SuperGLUE, SQUAD2.0, among others. It should be understood that this listing of machine learning models is exemplary and is not to be construed as exhaustive or limiting.

The models 175 operate upon the data file 170 to determine one or more outcomes of the one or more models 175. The attributes of the data file 170 each or together are an input to the models 175. In some aspects, the data file 170 in its entirety is an input to a model of the models 175, or individual or sets of the attributes, values, layouts, or images are inputs to the models 175. In some aspects, the models 175 accept inputs in addition to or instead of the data file 170. Such inputs include a time associated with the data file 170 (e.g., a time of receipt of the data file 170 by the computing system 105 or a time of transmittal of the data file 170 by the source 110), historical information (e.g., last receipt of a data file 170, a listing of the sources 110 that have provided a data file 170, a user profile associated with the source 110 or the client device 125, prior outcomes determined by the computing system or the models 175, among others), publicly or privately available data (e.g., databases or references from outside entities such as governments, non-profits, educational institutions, or data aggregated by the computing system 105, the client device 125, or the sources 110), user inputs (e.g., user annotations of one or more data files 170), among others.

In some aspects, the one or more outcomes of the models 175 include identifications, classifications, arrangements, information, or other properties of the data file 170. For example, the models 175 determine a number of the images of the data file 170, a layout associated with the data file 170, a vendor type associated with the data file 170, or sections of the data file 170. In some aspects, the models 175 identify null, void, or missing values or information of the data file 170 as an outcome. In some aspects, the models 175 identify the source 110 or the vendor type of the data file 170. As such, the models 175 determine a combination of attributes and other properties of the data file 170.

In some aspects, a first model 175A takes as input one or more outcomes of a second model 175B. In some aspects, the models 175 generate the outcomes sequentially, in parallel, or in a combination thereof. For example, a first model 175A determines a first outcome concurrently with a second model 175B determining a second outcome. In this illustrative example, a third model 175C determines a third outcome responsive to the first model 175A determining the first outcome, responsive to the second model 175B determining the second outcome, responsive to both the first model 175A and the second model 175B determining the first and second outcomes respectively, or independently of the first and second models altogether. This order or sequence of model operation is exemplary, and it should be understood that any combination of parallel and series operation of the models 175 is possible.

The client device 125 is or includes any computing device such as a laptop, a desktop computer, a smart phone, a tablet, etc. In some aspects of the technical solutions described herein, the client device 125 is operated by a user associated with an entity to perform various tasks associated with the entity. A user may operate, display, or otherwise execute an application via the client device 125. The client device 125 can be coupled with storage or memory. In some aspects, the client device 125 executes the application. The application is any platform for performing the various tasks associated with the organization, such as a low-code platform, no-code platform, software-as-a-service platform (SaaS), web application, web browser, desktop application, among others. In some aspects of the technical solutions described herein, the application is or includes an electronic transaction system.

In some aspects of the technical solutions described herein, the data handler 130, the model controller 135, the data parser 140, the section identification module 145, the policy classifier 150, the column classifier 155, the compliance validator 160, or the report generator 165 each include at least one processing unit or other logic device such as programmable logic array engine, or module configured to communicate with the data repository 115 or database. In some aspects, the data handler 130, the model controller 135, the data parser 140, the section identification module 145, the policy classifier 150, the column classifier 155, the compliance validator 160, or the report generator 165 are separate components, in some aspects they are a single component, and in some aspects they are part of the computing system 105. In some aspects, the system 100 and its components, such as the computing system 105, includes hardware elements, such as one or more processors, logic devices, or circuits.

The computing system 105 interfaces with, communicate with, or otherwise receive or provide information with one or more of the sources 110, the client device 125, or the server 120. In some aspects, the computing system 105 interfaces with at least one logic device such as a server 120. The server 120 is a computing device having a processor to communicate via a network 101. The computing system 105 includes or interfaces with the at least one server 120. In some aspects, the server 120 is a computation resource, server, processor or memory. For example, the computing system 105 includes a plurality of computation resources or processors. The server 120 facilitates communications between the computing system 105, the sources 110, and the client device 125 via the network 101.

The network 101 is a wireless or wired connection for enabling the computing system 105, the source 110, the client device 125, or the server 120 to store, transmit, receive, or display information to determine compliance of a data file 170. The computing system 105 communicates with internal subcomponents (described herein) or external components (e.g., the source 110, or the client device 125, among others) via the network 101. The computing system 105, for example, stores data about the system in the data repository 115. The computing system 105, for example, receives the data file 170 transmitted from the source 110. The network 101 includes a hardwired connection (e.g., copper wire or fiber optics) or a wireless connection (e.g., wide area network (WAN), controller area network (CAN), local area network (LAN), or personal area network (PAN)). For example, the network 101 includes WiFi, Bluetooth, BLE, or other communication protocols for transferring over networks as described herein.

In an illustrative example, the computing system 105 executes one or more models 175 to extract locations and information from a received data file 170 to determine whether the data file 170 complies with a procedure. The data handler 130 receives the data file 170 from the one or more source 110. The model controller 135 identifies, trains, and modifies the models 175 to perform the functionalities described herein. The data parser 140 determines a type of statements associated with the data file 170. The section identification module determines a location and label associated with a section of an image of the data file 170. The policy classifier 150 maps the label to a set of standardized labels. The column classifier 155 extracts information based on the standardized label and identified columns associated with the label and location. The compliance validator 160 detects a non-compliance of the information with a procedure. The report generator 165 performs an action responsive to the compliance validator 160 detecting the non-compliance.

Each subcomponent of the computing system 105 (i.e., the data handler 130, the model controller 135, the data parser 140, the section identification module 145, the policy classifier 150, the column classifier 155, the compliance validator 160, the report generator 165, or the data repository 115) communicates with each other to perform a function. In some aspects, each subcomponent is located on a separate server or one or more subcomponents are located on the same server. In some aspects of the technical solutions described herein, each subcomponent corresponds to a processor of the computing system 105 or one or more subcomponents has their functionalities executed by the same processors. In some aspects, the subcomponents or the computing system 105 operate or execute on the client device 125. For example, in some aspects of the technical solutions described herein, the operations of the computing system 105 operate on or are performed by an application operating on the client device 125.

In some aspects, the client device 125 performs one or more of the functionalities of the computing system 105, such as the functionalities associated with the data handler 130, the model controller 135, the data parser 140, the section identification module 145, the policy classifier 150, the column classifier 155, the compliance validator 160, the report generator 165, or the data repository 115. For example, the client device 125 executes an application to perform some or all of the functionalities of the policy classifier 150, or the client device 125 includes the policy classifier 150. In some aspects of the technical solutions described herein, the client device 125 includes one or more of the subcomponents of the computing system 105, such as one or more of the data handler 130, the model controller 135, the data parser 140, the section identification module 145, the policy classifier 150, the column classifier 155, the compliance validator 160, the report generator 165, or the data repository 115.

The computing system 105 includes a data handler 130 designed, constructed and operational to receive, identify, obtain, or otherwise access the data file 170 or the procedures 185. The data handler 130 is any combination of hardware and software for collecting, storing, processing, identifying or receiving information or data of the data file 170 or the procedures 185 from the sources 110. For example, the data handler 130 accepts the data file 170 transmitted from the source 110. The data handler 130 retrieves, queries for, aggregates, or otherwise obtains the data file 170 from the source 110. The data handler 130 receives the data file 170 from the source 110 via the network 101, a non-transitory computer-readable medium (e.g., a flash drive, CD-ROM, external hard drive, or other such physical data transfer medium), or via user inputs to the computing system 105 via a user interface associated with the computing system 105.

The data handler 130 retrieves or receives the data file 170 from the source 110 at regular or irregular intervals. In some aspects, receiving or retrieving the data file 170 refers to receiving the entire data file 170, or subset of the data file 170, such as a portion of the digital images contained within the data file 170. For example, the data handler 130 retrieves or receives the data file in its entirety at once from the source 110, or in correlated or non-correlated subsets (e.g., values related to income followed by values related to taxes). In some aspects, the data handler 130 aggregates the data file 170 or values of the data file 170 over a period of time. In some aspects, the data handler 130 receives or retrieves the data file 170 as values are updated or added. For example, the data handler 130 receives the values of the data file 170 responsive to values of the data file 170 being changed, deleted, added, or otherwise modified by the source 110. In some aspects, the data handler 130 receives or retrieves the entire data file 170 upon a modification of the data file by the source 110, or receives only the modified values of the data file 170.

In some aspects, the data handler 130 receives or retrieves more than one data file from a source 110A. For example, the data handler 130 receives a first data file 170 from the source 110A at a first time and receives a second data file 170' from the source 110A at a second time. The data handler 130 receives, retrieves, or aggregates the data file 170 periodically (e.g., every minute, every week), responsive to a change or modification of the data file 170 by the source 110, from a push or request from the source 110 to collect the data file 170, by a request (e.g., as implemented by a user or the client device 125), or by a push or query from a subcomponent of the computing system 105 (e.g., by the model controller 135 instructing the data handler 130 to retrieve the data file 170). In some aspects. the data file 170 is associated with a time stamp. In some aspects, the data handler 130 receives the data as a data stream or real-time data feed. In some aspects, the data handler 130 pings or polls the source 110 for the data file 170. In some aspects, the data handler 130 stores the data file 170 in the data repository 115. In some aspects, the data handler 130 accesses and modifies the data repository 115 to store or alter the various data files 170 collected.

The computing system 105 includes a model controller 135 designed, constructed and operational to train, maintain, identify, or operate the models 175. The model controller 135 trains the models 175 using one or more of the data files 170, historical data files, or values and images thereof. In some aspects, the model controller 135 identifies the models 175 for use by other subcomponents of the computing system 105. In some aspects, the model controller 135 stores or modifies the models 175 in the data repository 115.

The model controller 135 establishes or generate the models 175 using one or more of the data files 170. In some aspects, the model controller 135 instructs the data handler 130 to aggregate the data file 170 to train, generate, or establish the models 175. In some aspects. the model controller 135 instructs, causes, or pushes the data handler 130 to receive or retrieve the data file 170 at any time for training the models 175. The model controller 135 trains the models 175 using the data file 170, a subset of the data file 170, historical data files, input data by a user (e.g., such as annotations by the user from a user annotation tool or interface), or others of the inputs described herein. In some aspects, the model controller 135 segments, subsects, divides, or otherwise create subsets of the data file 170 to train the models 175. In some aspects, the model controller 135 divides the data file 170 based on a percentage of information. For example, the model controller 135 divides the data file 170 into two subsets wherein the first subset includes 30% of the digital images and the second subset includes 70% of the digital images. In some aspects, the model controller 135 divides the data file 170 based on data type, number of images, type of source, among others. In some aspects, the model controller 135 divides the data file 170 into a training data file and a test data file.

The model controller 135 feeds, supplements, or provides the training data file as inputs to the models 175 to train the models 175. In some aspects, the inputs include the inputs as described herein in addition to the training data file. In some aspects, the model controller 135 uses the training data file to train the models 175 based on known outputs of the training data file. In some aspects, the training data file is annotated by a user or otherwise have known outputs or outcomes. For example, a user operating the client device 125 annotates regions, information, or text of the images included in the training data file. As an illustrative example, the user annotates statements associated with the images by drawing a perimeter within one or more images to define a section of each image. In some aspects, the user labels the defined section with one or more labels 180. As an illustrative example, the user annotates statements associated with the images by indicating coordinates of the images, such as by entering numeric values associated with particular locations of the image or by selecting one or more coordinates upon the image, among others. Continuing with this illustrative example, the user may, through the client device 125, label the coordinates or a perimeter defined by the coordinates to indicate a section. During annotation, in some aspects a user may identify and label one or more sections for each digital image included in the training data file. In some aspects, the user selects the training data file or the images included within the training data file. For example, using the client device 125, the user selects an amount or particular images of the data file 170 to annotate with sections and labels 180.

The labels 180 are indicators for sections based on the values included within the sections. The labels 180 define a type of information or values included within the defined sections. For example, the labels 180 include color indicators, text, highlights, or other indicators to convey the type of values or information contained within a section. Example labels 180 include policy, wage rate, deductions, earnings, among others. In some aspects, policy refers to a set of values determined by or changeable by the entity. For example, a policy label applies to values related to vacation time or sick time, whereas an employee name or wage is not considered a policy. In some aspects, the labels 180 include sublabels, also referred to as the labels 180. For example, a label of "policy" includes labels such as vacation time, sick time, holiday time, among others.

By providing the training data file with the inputs and known outputs to the models 175, the model controller 135 generates the trained models 175. For example, the training data file includes the data file 170 with a large variety of data types, images, layouts, vendor types, or other attributes. In some aspects, the training data file is marked to distinguish each attribute of the training data file. In some aspects, the model controller 135 generates the trained models 175 by providing the inputs to create the known outputs. This process can be iterative and can utilize any of the inputs or machine learning models described herein.

The model controller 135 validates the trained models 175 using the test data file. With generation of the models 175, the model controller 135 provides inputs based on the test data file to determine a validity of each of the models 175. In some aspects, the validity of each of the models 175 relates to an error. In some aspects, the error is the difference between the known outcomes of the test data file and actual outcomes when inputs based on the test data file are provided to the models 175. For example, the test data file includes a known input and outcome. Upon providing the known input to a model trained to accept that input, the model 175 provides the known outcome, or provides a different, erroneous outcome. This comparison between the known outcome and the model-generated outcome can be repeated for various inputs of a model 175 to generate an overall error score or rate. In some aspects, the error score or rate relates to the validity of the model. In some aspects, if the error score or rate for the model 175 exceeds a threshold error, the model is considered invalid or erroneous. In some aspects, if the error score or rate for the model 175 is at or below the threshold error, the model 175 is considered valid. In this manner, each model 175 is validated.

In some aspects, the model controller 135 retrains the models 175. In some aspects, the model controller 135 retrains the models 175 responsive to the error score of the one or more models 175 being above a threshold error. In some cases, the model controller 135 determines that the error score of the models 175 is above the threshold error (e.g., invalid) responsive to generation of the models 175 by the model controller 135. For example, the model controller 135 determines that a model 175A of the models 175 is invalid based on an error score of the model 175A exceeding an error threshold for the model 175A upon generation. In some aspects, the model controller 135 determines that the models 175 are invalid prior to the model controller 135 identifying the models 175. In some aspects, the model controller 135 determines that the models 175 are invalid prior to storing the models 175 in the data repository 115. In some aspects, the model controller 135 checks the models 175 periodically to determine validity of the models 175. For example, a model 175A which was once valid can drift, or become less valid or have a higher error score over time. In some aspects, the model controller 135 determines that the models 175 are invalid or above a threshold error at any time. In some aspects, the model controller 135 checks the validity of the models 175 stored in the data repository 115, the models 175 generated by the model controller 135, or other models 175 of the system 100.

Upon the model controller 135 determining that one or more models 175 are invalid (e.g., the error score is above the threshold error), in some aspects the model controller 135 instructs the data handler 130 to aggregate, collect, or retrieve second data files 170 or second images of the data file 170. With receipt of the second data files 170' or second images of the data file 170, the model controller 135 retrains the models 175. In some aspects, the model controller 135 divides the second data files 170' or second images of the data file 170 into subsets, such as a second training data and a second test data. In some aspects, the model controller 135 combines the second data files 170' and the data files 170 or second images of the data file 170 with the image of the data file 170. In some aspects, the model controller 135 combines subsets of the data files 170 and 170'. For example, the model controller 135 incorporates, combines, or adds the second training data of the second data file 170' to the training data of the data file 170. With the aggregation of the second data file 170', the model controller 135 provides further inputs and known outcomes to further train the models 175. In some aspects, the model controller 135 retrains the models 175 with an error score above the threshold error, all of the models 175, or selected models 175. In some aspects, the model controller 135 trains the models 175 or a subset of the models 175 subsequent to the elapse of a period of time. For example, the model controller 135 retrains a model 175A every week, a model 175B every year, a model 175C upon its error score exceeding the threshold error for the model 175C, or never retrains a model 175D. In some aspects, the model controller 135 retrains the models upon receipt of a user input. For example, upon one or more trained models 175 providing an output, the user annotates, modifies, or otherwise changes the output. For example, for a first model 175A that produces a label for a section of an image, the user may modify the label produced by the first machine learning model 175A. In this manner, the machine learning models 175 learn and retrain from a data file 170 annotated with corrections for prior outputs generated by the models 175.

In some aspects, the model controller 135 checks the retrained models 175 for validity. In some aspects, the model controller 135 checks or tests the retrained models 175 as described herein, by comparing an error score of each model 175 with a threshold error for each model 175. Upon the model controller 135 determining that one or more of the retrained models 175 are invalid, the model controller 135 can aggregate a third data file 170" and repeat the retraining process. In some aspects. the retraining process is repeated until the error score of the model 175 is below the threshold error. In some aspects, the model controller 135 issues an alert or notification if the model 175 fails testing or retraining a threshold number of times to the client device 125.

Upon the model controller 135 determining that the retrained models 175 or the trained models 175 are valid, the model controller 135 stores the models 175 in the data repository 115. In some cases, the model controller 135 replaces a first model 175A with a retrained model 175B. In some aspects, the model controller 135 replaces the first model 175A with the retrained model 175B based on user input, or based on the first model 175A having an error score above the threshold. In this manner, models 175 which have drifted, become erroneous, or no longer represent the data file 170 are replaced by the model controller 135 to ensure validity of the system 100.

In some aspects of the technical solution described herein, the model controller 135 generates and validates the models 175 in parallel, series, or a combination thereof. For example, the model controller 135 generates, validates, or stores a first model 175A concurrently with a second model 175B. In some aspects, the model controller 135 generates, validates, or stores a first model 175A prior to the generation of a second model 175B. In some aspects, a subsequent model uses as input an outcome of a prior model. In these aspects, the model controller 135 generates, validates, or store the subsequent model after the prior model. Upon training of the models 175 and receiving the data file 170, the data parser 140 can determine a type related to the data file 170.

The computing system 105 includes a data parser 140 designed, constructed and operational to determine a type of a plurality of statements. The data file 170 received by the data handler 130 includes one or more images corresponding to a set of statements, as described herein. The data parser 140 determines a type of the plurality of statements using one or more of the models 175, such as a text classification model. The data parser 140 identifies attributes of the data file 170, such as a vendor type or data type, using the text classification model included in the models 175. Furthermore, in some aspects, the data parser 140 filters, curates, or scrubs the data file 170. In some aspects, the data parser 140 removes, deletes, or modifies duplicate values or arrangements of the data file 170.

In some aspects, the data parser 140 use a first model 175A to determine the type of the statements of the data file 170. In some cases, the first model 175A includes one or more machine learning models such as XGBoost, SVM, or Random Forests to detect the type of the statements. In some aspects, the data parser 140 takes as input a plurality of statements of the data file 170. The data parser 140 can determine, identify, or recognize the images of the data file 170. The data parser 140 can analyze each image of the data file 170 to determine or identify junk within the data file 170. Junk can include blank rows, columns, or images of the data file 170; erroneous values or blank values; or duplicate values, sheets, rows, or columns, among others.

With identification of the junk within the data file 170, in some aspects the data parser 140 removes, deletes, or otherwise modifies the data file 170. In some aspects, the data parser 140 converts the data file 170 from a first file type to a second file type. For example, the data file 170 can be in a .PDF format and the data parser 140 converts the data file 170 to a .JPEG format. In some aspects. the data parser 140 removes, deletes, or modifies the junk to remove it from the data file 170. For example, the data parser 140 identifies a blank column within an arrangement of the data file 170 and deletes that column. In some aspects, the data parser 140 identifies and remove extraneous values, such as a repeated or duplicate image. For example, the data parser 140 determines that an image of the data file 170 is a duplicate image and deletes the duplicate image from the data file 170. In some aspects, the data parser 140 identifies or remove superfluous values from the data file 170 or an image of the data file 170. For example, the data parser 140 identifies that a value of a sheet does not a correspond to an input of any of the models 175 and removes the superfluous data as a result. In this manner, the data file 170 can be scrubbed to facilitate faster and more accurate processing of the data file 170 by the other components of the computing system 105.

In some aspects. the data parser 140 uses one or more models 175 (e.g., the first model 175A) to parse text or strings of the data file 170, such as text or string values within one or more images of the data file 170. The data parser 140 can identifies a type for the statements of the images of the data file 170. For example, the data parser 140 identifies a vendor type or a data type for the data file 170. In some cases, the data file 170 indicates the type of the statements, whereby the data parser 140 recognizes the identification. In some cases, the data file 170 does not identify the type of the statements, in which cases the data parser 140 uses the first model 175A to identify the type from the text or string values of the data file 170. The data parser 140 identifies the type of the statements using the first model 175A, by using another model 175N, or a combination thereof. The data parser 140, through the first model 175A or another model 175N, uses object recognition or text classification models 175 as described herein to identify the type of the statements.

In some aspects. the data parser 140 classifies the data file 170 into a vendor type for each image of the data file 170.

In some cases, a data file 170 includes one data type common to each image within the data file 170. In some aspects, a vendor type includes a name or identifier of the source 110, an entity, among others. In some aspects, each image of the data file 170 corresponds to a different vendor type.

Upon receiving identifying the type of the statements, the model controller 135 identifies the second model 175B relating to the type of the statements and annotated statements with labeled sections. In some aspects, the second model 175B is trained with annotated statements, images, or data file 170 as described herein. In some aspects, the model controller 135 selects the second model 175B of a plurality of models 175 relating to a plurality of statement types, based on the type of statements identified in the data file 170. In some aspects, identifying the model 175B refers to the model controller 135 accessing, retrieving, or making available the models 175 for the computing system 105. In some aspects, identifying the models 175 refers to the model controller 135 selecting or determining an order of operation of the models 175 on the data file 170. The model controller 135 can identifies, makes available, or provides the selected second model 175B to the section identification module 145.

The computing system 105 includes a section identification module 145 designed, constructed, and operational to determine a location and the label 180 of a section in a first digital image of the set of digital images corresponding to a first statement of the statements. The section identification module 145 is any combination of hardware and software to identify a section including a label 180 and a location for each or any images in the data file 170.

Determining the location of one or more sections of an image of the data file 170 includes determining one or more coordinates or perimeters of the section. In some aspects, the section identification module 145 includes the second model 175B. In some aspects, the second model 175B is or employs a computer vision model, such as YOLO as described herein, to determine one or more locations associated with the one or more identified sections. In some aspects, the second machine learning model 175B identifies features of the image such as a format of the values (e.g., text, image, etc.), or a feature associated with the format (e.g., bold or italicized text, color or black and white images).

In some aspects, determining the locations includes determining a location of a label or a perimeter containing some or all of the values of the section, such as in relation to other values of the image or at distances denoted by the image including the section. In some aspects, the section identification module 145 determines bounding boxes in each image of the data file 170 as corresponding to a section. As an example, the section identification module 145 may provide an image as input to the second machine learning model 175B. The second machine learning model 175B identifies lines, text, or shapes that correspond to a section, as indicated in annotated training data files used to train the second machine learning model 175B. In some aspects, upon identifying a section within the image, the second machine learning model 175B determines coordinates in the image corresponding to the section. As an example, the second machine learning model 175B determines four coordinates defining vertices of a perimeter of the section. As an example, the second machine learning model 175B determines a coordinate of a center of a section. As an example, the second machine learning model 175B determines a coordinate and a radius associated with a circular perimeter of a section of the image.

Using the second machine learning model 175B, the section identification module determines the labels 180 for the identified sections. In some aspects, determining the labels 180 includes assigning labels, classifications, or predefined categories to identified sections. In some aspects, determining the labels 180 includes identifying labels contained within the image and associated with the section. In some cases, the section identification module determines the labels 180 based on the text or strings associated with the section. In some cases, the section identification module 145 determines the labels based on a proximity (e.g., distance) to the identified location of the section. In some cases, the section identification module 145 determines the label 180 for the section by mapping text within a proximity to the section to a library of standardized labels. For example, the section identification module 145 determines a string reading "emp name" a threshold proximity within the location of the section. In this example, the section identification module 145 maps "emp name" to the label 180 "Employee Name" based on a library of labels and using computer vision functionalities of the second machine learning model 175B.

The sections represent a subset of the values of an image of the data file 170 which correspond or relate to each other. For example, the sections are a grouping of columns or rows within the image which relate to a similar data type, vendor type, or value. For example, the section identification module 145 identifies the sections based on the type of the pay statements and can separate subsections of an image according to the identified locations, such as subsections corresponding to master data, earnings data, deductions data, and tax data. In some aspects, the section identification module 145 assigns the labels 180, such as classifications or predefined section categories to the identified sections. Examples of section labels include company info, date info, company totals, employee totals, check totals, report totals, date info, net pay, or taxes, among others. Based on the determined label and location, the computing system 105 extracts information from one or more images of the data file 170.

The computing system 105 includes a policy classifier 150 designed, constructed, and operational to determine sections related to policies and extract information from those sections. The policy classifier 150 includes any combination of hardware and software to identify sections related to policies based on the location and label of the section. In some aspects, identifying sections related to policies includes assigning labels, classifications, or predefined policy categories for the labels of the sections. For example, identifying the sections related to policies includes marking the label associated with a section as a policy or a non-policy, among other classifications. In some aspects, the policy classifier 150 generates a mapping of the locations associated with the sections and the labels associated with the sections. In this manner, the policy classifier 150 extracts information from the images of the data file 170 based on the location and labels of the sections.

In some aspects, the policy is a value of the image implemented by the source 110, the client device 125, or the computing system 105 which affects other values of image. In some aspects, the policy includes a policy related to vacation, birthdays, wages, or gross pay. For example, a policy is a value denoting the maximum vacation time accruable by an employee, or a policy is the wage rate for an employee for given years of experience. For example, a birthday policy can be a value of the image including a date of an employee's birth which increments an employee's vacation time upon passing the birthday date. In some aspects, the policies are defined by the source 110, the client device 125, or the computing system 105 automatically or by user annotation. For example, a user of the client device 125 selects, devises or otherwise defines and implements policies for one or more data files 170.

In some aspects, the policy classifier 150 determines whether a standardized mapping for a section exists based on the label assigned to the section. In some cases, one or more labels are associated with standardized policies, labels, or sections. These standardized policies, labels, or sections can be established by a system administrator, received from the source 110, or stored in the data repository 115. In some aspects, the policy classifier 150 determines if a mapping to a standard label exists within a library of label mappings, as described herein. Upon a determination that the mapping exists for a section based on the section's label and location, the policy classifier extracts the information for the section according to the mapping. As an example, a standard mapping of "emp_name" to "Employee Name" can indicate the label conforms to a standardized policy for the section and enables the policy classifier 150 to extract the information (e.g., values taken from the image related to the label) from the image, such as extracting the value "Jane Doe." If a mapping to a standard label, policy, or section is not identified by the policy classifier 150 for a section, the information of the section is extracted by the column classifier 155.

The computing system 105 includes a column classifier 155 designed, constructed, and operational to extract information from sections which do not map to a standard label or policy. In some aspects, one or more types of pay statements or data file 170 include information or values which are not associated with standardized labels included in a library of labels. In those aspects, the column classifier 155 utilizes a support vector machine to determine or generate a mapping for the sections which do not map to a standard label or policy.

The column classifier 155 identifies columns associated with the images of the data file 170. The columns are vertical groupings of values of the section for each of the images of the data file 170. In some aspects, the column classifier 155 identifies the columns using a third machine learning model 175C, such as a support vector machine, and extracts the information from the columns. In some aspects, the column classifier 155 identifies the columns by identifying (through the third machine learning model 175C) features of values which correspond to a column. For example, the third machine learning model 175C uses features of the values such as data type, text, vendor type, or layout to determine which classification of column (if any) a value belongs to. The column classifier 155 classifies the identified columns based on predetermined classifications or labels. As an example, the column labels include employee info, preamble rows, earnings info, tax info, deductions info, or null info, among others.

By identifying columns, the column classifier 155 can provide the columns as input to the third machine learning model 175C. The third machine learning model 175C can determine a text classification of the column based on the values included in the column. In some aspects, the column classifier 155 compares the output of the third machine learning model 175C with the library of labels to determine a corresponding standardized mapping for the columns. For example, the third machine learning model 175C determines that a set of values of a column is related or classified under a label 180. By determining a classification for the column, the column classifier 155 is able to extract the information from the columns.

The computing system 105 includes a compliance validator 160 designed, constructed, and operational to detect a non-compliance with a procedure. The computing system 105 is any combination of hardware and software for detecting, based on a comparison of the extracted information with threshold information established for the label 180, a non-compliance with the procedure 185. For example, the compliance validator 160 determines, based on the label associated with a section and the extracted information for that section, whether the section or image complies with the procedure.

In some aspects, complying with the procedure 185 refers to the information within the extracted sections conforming to one or more rules of the procedure. In some aspects, the one or more rules of the procedure 185 are associated with threshold information. For example, a section is said to comply with the procedure 185 if the section satisfies the threshold information associated with the section. In some aspects, the label 180 associated with the section includes or defines the threshold information. For example, a first label of "Deductions" associated with a first section of an image can have different threshold information than a second label of "Benefits" associated with a second section of the same image.

The threshold information defines information to include in a section or image of the data file 170, based on the label. In some aspects, each label 180 is associated with values, quantities, or other parameters of information. For example, a first label 180A of "Pay Period" is associated, in some aspects, with threshold information including values of total hours worked, duration of pay period, and start and end date of the period. In this example, a section with the label "Pay Period" satisfies the threshold information (e.g., complies with the procedure) if the extracted information for the sections includes values of total hours worked, duration of pay period, and start and end date of the period.

In some aspects, the threshold information for the label differs based on the extracted information within the section or image. In some aspects, the compliance validator 160 selects the threshold information for the procedure 185 based on the type of the plurality of statements and a geographic location relating to the first statement. For example, the compliance validator 160 selects first threshold information for a first label 180A within a digital image associated with a pay statement and second threshold information for the first label 180A within a second digital image associated with a contract. For example, the compliance validator 160 selects first threshold information for a first label 180A within a digital image including extracted information indicating Texas and selects second threshold information for the second label 180A within a second digital image including extracted information indicating Maryland. In some aspects, the compliance validator 160 selects the threshold information for the procedure 185 based on at least one of a date of the first statement, a region code of the first statement, or a company code of the first statement. The date of the statement includes, among others, pay period, start date, end date, mailed date, pay date, or dates of work. The region code of a statement is an alphanumeric string denoting a geographic location of an employee's or entity's residence, place of work, or other location. The company code is an alphanumeric string associated with a specific entity, such as a tax number associated with a corporation or an address of a company. In this manner, the compliance validator 160 applies procedures 185 differently for different regulations associated with different entities, locations, or types of statements.

In some aspects, if the section does not satisfy the threshold information, the section is said to be incompatible (e.g., have a non-compliance with) the procedure 185. In some aspects, the compliance validator 160 detects the non-compliance by detecting an erroneous value in the extracted information. In some aspects, the compliance validator 160 detects the non-compliance by determining a missing value in the extracted information. A missing value is a value that is null or blank when, based on the threshold information for the label, there should be a non-null value. For example, a label of "Social Security Number" is associated with a nine-digit number. If the nine-digit number is not present in the extracted information, the value is determined to be missing and the compliance validator 160 will detect a non-compliance based on the missing value. An erroneous value is a value which does not comply with the type of statement, the label, or the section. For example, a label denoting "Social Security Number" is associated with a nine-digit number. If the nine-digit number includes letters, is not nine-digits long, or has other errors not complying with a social security number, the compliance validator 160 will detect a non-compliance based on the erroneous value.

The compliance validator 160 determines compliance of each section and/or image the based on the labels assigned to the sections of the data file 170. As an illustrative example, a section of an image of the data file 170 is associated with a label "tax info." In this illustrative example, the compliance validator 160 selects threshold information indicating that text of the value must relate to tax info. For example, the text of the value must include at least one of a marital status, income bracket, number of dependents, among others. The threshold information and procedures 185 presented herein for the are meant by way of example and can extend to any other rules for determining the compliance of a section or image of the data file 170 based on the labels assigned by the components of the computing system 105.

In some aspects, the computing system 105 extracts second information from a second section at a second location in the first image having a second label. For example, the processes described herein are extendable to multiple sections within multiple images of multiple data files. The compliance validator 160 determines compliance for each section based on the extracted information within each section of the data file 170 and the associated labels with each section of the data file 170. In this manner, the compliance validator 160 determines the non-compliance for each section using the extracted information of each section. In some aspects, the compliance validator 160 determines compliance for each image of the data file 170 based on the compliance of the sections within the image. For example, the compliance validator 160 determines an image of the data file 170 to be compliant (e.g., not possess a non-compliance with the procedures 185) if each section of the image is compliant (e.g., if the compliance validator 160 does not detect a non-compliance for any section of the image). Furthermore, in some aspects the compliance validator determines compliance for the data file 170 overall based on the compliance of the sections within the data file 170 or the images of the data file 170. For example, the compliance validator determines that the data file 170 is compliant if each image (and thereby each section) of the data file 170 satisfies its respective threshold information, based on the extracted information for each image/section.

In some aspects, the compliance validator 160 generates a metric indicative of a level of compatibility of the plurality of statements. In some aspects, the level of compatibility of the plurality of statements includes a likelihood that each image of the data file 170 satisfies one or more procedures 185. In some aspects, the level of compatibility of the plurality of statements includes a percentage of images of the data file 170 that do or do not satisfy the one or more procedures 185. In some aspects, the computing system 105 performs an action responsive to the detection of a non-compliance or the determination of the compliance. In some aspects, the computing system 105 performs an action responsive to the metric indicative of the level of compatibility of the plurality of statements satisfying a threshold.

The computing system 105 includes a report generator 165 designed, constructed, and operational to perform an action responsive to determining the non-compliance with the procedure 185. The report generator 165 is any combination of hardware and software to perform an action based on the determination of compliance for the data file 170 by the compliance validator 160. For example, the report generator 165 generates a report, performs a human resources operation, generates data structures, or performs other actions responsive to the detection of compliance or non-compliance for the data file 170.

In some aspects, the report generator 165 constructs a data structure. In some aspects, the data structure is or includes a file type the same or different from the file type of the data file 170, as described herein. In some aspects, the data structure is or includes a list, table, image, graph, or vector, among others, that includes the extracted information from the digital images of the data file 170. For example, the report generator 165 generates a spreadsheet including the extracted information. In some aspects, the report generator 165 marks, labels, or annotates the extracted information in the data structure. For example, the report generator 165 annotates the extracted information in the spreadsheet with the label corresponding to the section including the extracted information.

The report generator 165 generates a report for presentation on the client device 125. For example, the report generator 165 generates a JSON file type using the extracted information from each section of the data file 170. For example, the report generator 165 generates a report including a spreadsheet with the extracted information. In some aspects, the report includes the data structure generated by the report generator 165, such as a spreadsheet, list, table, or vector. In some aspects, the report generator 165 annotates the information with the associated label for use in the electronic transaction system. In some aspects, the report includes features such as the mapping of the labels using the library of labels, the metric indicative of the level of compatibility of the plurality of statements, the type of the statements, the extracted information, among others. In some aspects, the report generator 165 provides an indication of one or more of the statements of the data file 170 that include a non-compliance.

In some aspects, the report generator 165 generates two or more reports including the one or more of the aforementioned features. The report generator 165 presents the one or more reports to alert of a non-compliance with the procedure 185. For example, the report generator 165 presents the one or more reports on a screen or interface of the client device 125. In some aspects, the report generator 165 presents the extracted information on the screen or interface of the client device 125. In some aspects, the extracted information includes the extracted information, the identified and extracted facets (e.g., the labels, policies, columns, etc.), labels assigned to the sections, among others.

In some aspects, in presenting the report the report generator 165 presents the metric indicative of the level of compatibility of the plurality of statements. For example, the report generator 165 presents a table including a metric indicating the likelihood that each or all digital images of the data file 170 are compliant. For example, the report generator 165 presents a table including a metric indicating a number of incompatibilities of each or all digital images of the data file 170.

The report generator 165 presents indications of the detected incompatibilities via a display device of the computing system 105 or the client device 125. For example, the report generator 165 marks, color codes, highlights, lists, or otherwise provides an indication via the display device of information that is missing, invalid, erroneous, or otherwise incompatible with the procedure 185. In some aspects, the report generator 165 provides a notification of the incompatibilities. For example, the computing system 105 transmits a notification to the client device 125 to alert an operator or user of a detection of incompatibilities. In some aspects, the notification includes the report. In some aspects, with the presentation of the incompatibilities, the computing system 105 accepts inputs (via the display device of the computing system 105 or the client device 125) to correct the incompatibilities. For example, a user operating the client device 125 provides missing values, corrects erroneous values, or re-labels mislabeled values. In some aspects, the computing system 105 and/or the client device 125 accepts a text, vocal, pictorial, or other input to repair the non-compliance. For example, an operator of the system can enter (via a user interface coupled with the display device) a typed value of "123-45-6789" to replace an invalid value of "123-45." In some aspects, the one or more models 175 are iteratively or continuously trained on this operator-supplied input to better refine the detection of incompatibilities by the computing system 105.

Thus, the technical solutions described herein enable the detection of incompatibilities within varying data files to determine adherence to a procedure. Furthermore, by presenting and identifying the incompatibilities, the technical solutions described herein provide a practical application to solve the problem of determining compliance for various and changing statements. In this manner, overall computing resources are reduced compared to systems which do not implements the customized machine-learning models and non-compliance detection techniques described herein.

Figure 2:
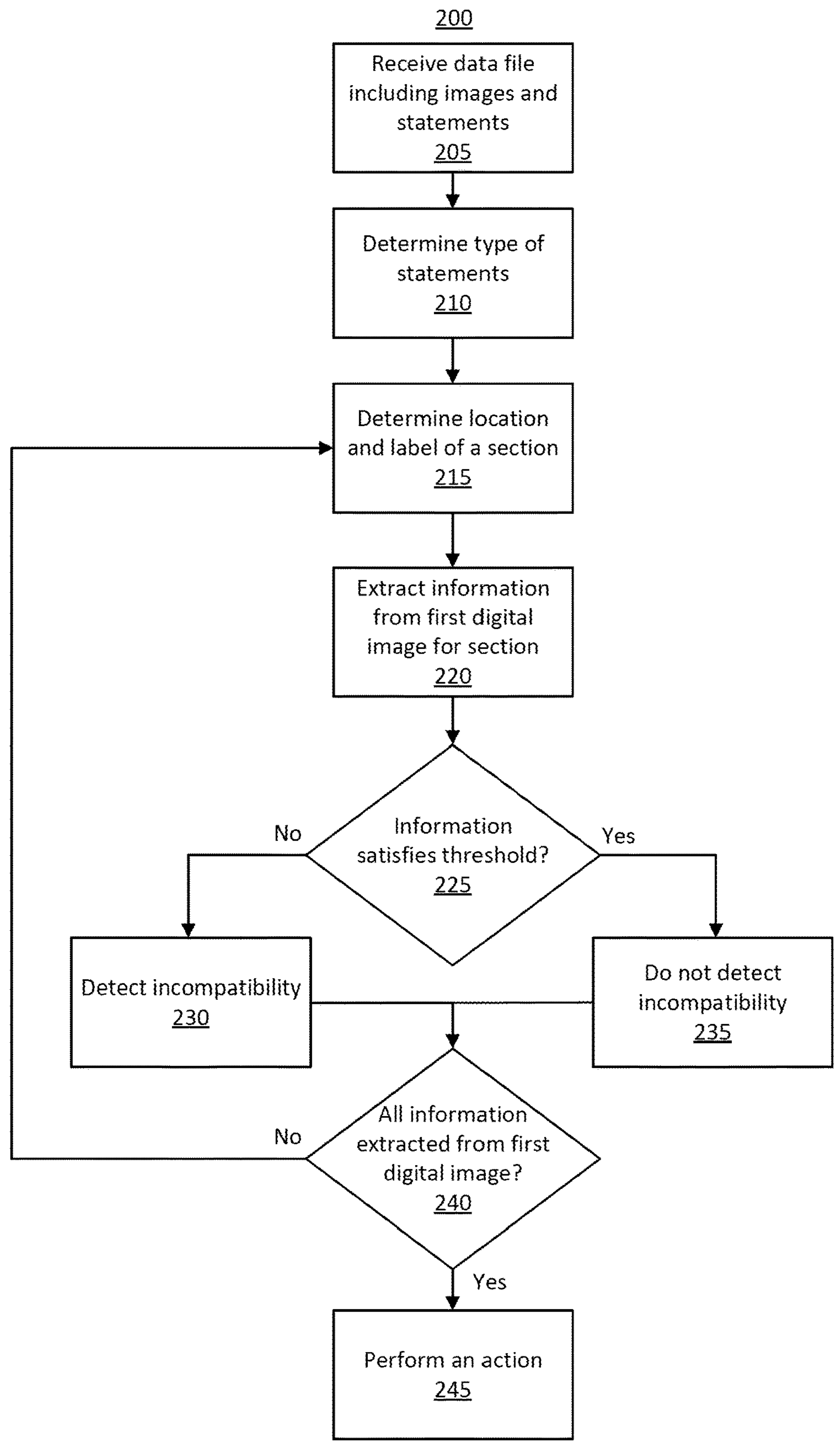
FIG. 2 depicts an example method for automatic compliance via custom integrated machine learning models.

FIG. 2 depicts an example method 200 for determining automatic compliance via custom integrated machine learning models according to one or more aspects of the technical solutions described herein. The method 200 is performed by one or more systems or components depicted in FIG. 1, FIG. 10, or FIG. 11, including, for example, a computing system. The method 200 includes ACTS 205-245. The acts of the method 200 can be performed in any order or sequence, including performing acts in parallel.

At ACT 205, the method 200 includes the computing system receiving a data file (e.g., the data file 170) including images and statements. The data file includes digital images associated with one or more statements. For example, the data file includes digital images associated with pay statements, contracts, bills of material, or other types of statements. In some aspects, the computing system receives or retrieves the data file from one or more sources. In some aspects, the one or more sources are included within the computing system. In some aspects, the one or more sources are separate or remote from the computing system. In some aspects, a portion of the one or more sources are separate form the computing system and a portion of the one or more sources are included in the computing system.

At ACT 210, the computing system determines a type of the statements. In some aspects, the computing system determines a type of the statements responsive to receiving the data file including the digital images and statements. In some aspects, the computing system determines the type of the statements using a machine learning model, such as the machine learning models 175. In some aspects, the computing system uses a text classifier to determine the type of statements based on the text included within the digital images of the data file. For example, based on the classified text of the digital images, the computing system determines that the type of statement is a pay statement associated with a first entity, a pay statement associated with a second entity, a contract, an EOB, etc.

At ACT 215, the computing system determines a location and a label of a section. The images of the data file include one or more sections. In some aspects, the computing determines the locations and labels of a section responsive to determining a type of the statements associated with the digital images. In some aspects, the computing system uses one or more machine learning models, such as the machine learning models 175, to identify, locate, and label the one or more sections. For example, the computing system provides the digital images, the type of the statements, or other inputs to a machine learning model performing computer vision or object recognition to identify the sections. In some cases, the computing system determines coordinates associated with the sections, such as coordinates indicating the location of the section within the digital image. In some cases, the computing system determines labels for each identified section based on text, a format, a layout, or other attributes of the section identified by the computing system.

At ACT 220, the computing system extracts information from a first digital image of the digital images of the data file. The computing system extracts information for a section of the first digital image. In some aspects, the computing system extracts the information responsive to determining a location and label of a section of the digital image. In some aspects, the computing system extracts the information based on the labels and locations of the section. For example, the computing system identifies values within the section and extracts information from the values by mapping the label associated with the section to a library of labels indicating information included within a section under that label. In some aspects, the label of the section does not map to a label within the library of labels. In those aspects, the computing system utilizes a machine learning model, such as the machine learning models 175, to classify text included within the section to determine or generate a label and corresponding information for the label based on the information associated with the labels within the library of labels. For example, the computing system determines, using a support vector machine, that a frequency of words within a section matches one or more pieces of information of one or more labels of the library of labels. In this example, the computing system may generate an association of information for the unmapped label based on the matching one or more labels of the library of labels.

At ACT 225, the computing system determines if the extracted information satisfies a threshold. In some aspects, the computing system determines if the extracted information satisfies the threshold responsive to extracting the information from a section of the first digital image. In some aspects, the computing system determines if the extracted information satisfies an information threshold related to a procedure for the statements of the data file. For example, the computing system determines if information specified in the procedure is included in the extracted information, as indicated by the information threshold. In some aspects, satisfying the threshold includes the extracted information matching the information indicated in the procedure. In some aspects, not satisfying the threshold includes the extracted information missing information of the procedure, having erroneous information, or being mislabeled. Upon a determination that the information satisfies the threshold, the computing system proceeds to ACT 235. Upon a determination that the information does not satisfy the threshold, the computing system proceeds to ACT 230.

At ACT 230, the computing system detects a non-compliance. The computing system detects a non-compliance with a procedure. In some aspects, the computing system detects the non-compliance responsive to determining that the extracted information does not satisfy the information threshold. In some aspects, the computing system logs the non-compliance related to a location, label, section, or digital image of the data file. At ACT 235, the computing system does not detect a non-compliance. In some aspects, the computing system does not detect the non-compliance responsive to the extracted information satisfying the information threshold. That is, the extracted information of the section matches, satisfies, or comports with the information indicated in the procedure.

At ACT 240, the computing system determines if all information has been extracted from the first digital image of the data file. In some aspects, the computing system determines if all information has been extracted responsive to either detecting or not detecting a non-compliance for a section of the digital image. In some aspects, the computing system will not have extracted all information from the first digital image if the computing system has not extracted information from each identified section of the digital image. Upon a determination that the computing system 105 has not extracted all the information from the first digital image, the computing system 105 proceeds back to ACT 215 to iteratively retrieve information from each section of the digital image to detect incompatibilities.

At ACT 245, the computing system performs an action. In some aspects, the computing system performs the action responsive to determining that all information has been extracted from the first digital image. In some aspects, the computing system performs the action responsive to extracting the information from all the digital images of the data file. In some aspects, the action performed by the computing system includes generating a notification. The notification alerts a user that incompatibilities with the procedure have been detected in the digital image or the data file. In some aspects, the action performed by the computing system includes generating a report. In some aspects, the notification includes the report. In some aspects, the computing system generates a report including the extracted information associated with labels from the sections from which the information was extracted. In some aspects, the computing system generates a report including a metric. In some aspects, the metric indicates a level of compatibility with the statements of the data file.

Figure 3:
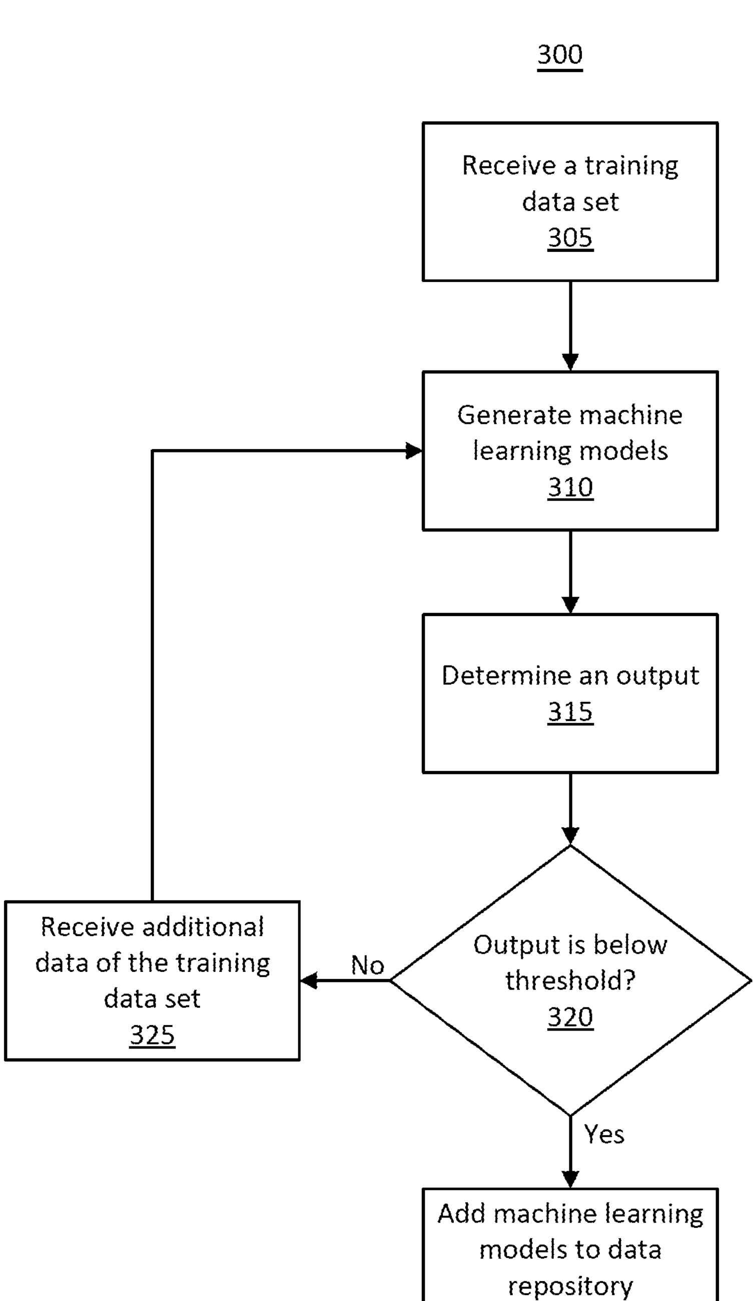
FIG. 3 depicts an example method for training a machine learning model for automatic compliance.

FIG. 3 depicts a method 300 for training machine learning models for automatic compliance of data files according to one or more aspects of the technical solutions described herein. The method 300 is performed by one or more systems or components depicted in FIG. 1, FIG. 10, or FIG. 11, including, for example, a computing system. At ACT 305, the computing system receives a training data file. The computing system receives a training data file from a remote database (e.g., the source 110), one or more client devices (e.g., the client devices 125), or other sources. The training data file includes one or more client requests, one or more data, or one or more user profiles, among others. The computing system divides the training data file into one or more subsets. The computing system divides the training data file into a set of test data and a set of input training data. In some aspects, the training data file includes annotated sections of a data file, such as the data file 170.

At ACT 310, the computing system generates machine learning models. The computing system generates the machine learning models (e.g., the models 175) by training one or more machine learning models using a subset of the training data file. For example, the computing system uses the training data file as inputs for one or more of the machine learning models. The machine learning models can be trained on different subsets of the training data file. The computing system stores the trained models in memory.

At ACT 315, the computing system determines an output. The computing system determines an output (e.g., outcome) of the machine learning models. In some aspects, the computing system determines the output responsive to generating the machine learning models. The computing system determines an output of the models or models using the training data file. For example, the computing system provides the test data as input to the machine learning models. The output of the models is determined from the inputs (e.g., the test data) provided to the models. The models generate or create outputs based at least on the training data. The models generate or create one or more outputs. In some aspects, a model generates an output based on an output of another model. In some aspects of the technical solutions described herein, the outputs include the inconsistencies, a type of the statements, locations of sections, or labels of sections, among others.

At decision block 320, the computing system determines if the output is below a threshold. The computing system compares the outputs to a threshold. In some aspects, the threshold is an error score. The error score indicates a maximum error allowable by one or more of the machine learning models. In some aspects, each model has a different error score. The output being below a threshold refers to an error score of the model or model being below the threshold error score. In some aspects, the error score of the model is determined as a ratio of “correct” outputs (e.g., outputs generated by the model correlating to a known output of the test data) to total outputs, a ratio of “incorrect” outputs (e.g., outputs generated by the model that do not correlate to a known output of the test data), or a mean square error of the outputs, among others. The computing system establishes a threshold error score for the models. If the output of a model exceeds the threshold error score, the computing system proceeds to ACT 325.

At ACT 325, the computing system receives additional data of the training data file. The computing system receives additional data responsive to the output of a model exceeding or equaling the threshold. The computing system prompts, queries, or requests additional data from the database or the client device. The computing system aggregates additional data from the database or the client device over time to create the additional data of the training data file. The additional data of the training data file can be additional data aggregated over a period of time or a new data file. Upon receiving the additional data, the computing system generates the machine learning models using the additional data in ACT 310.

At ACT 330, the computing system adds the models to the data repository. In some aspects, the computing system adds the machine learning models to the data repository responsive to the output of the models being below the threshold. In some cases, the computing system adds some models which are below the threshold and does not add some models which are not below the threshold. Adding the models to the data repository includes updating a set of existing models to include the generated models with outputs below the threshold. The models are stored in a memory of the computing system for access by the computing system.

Figure 4:
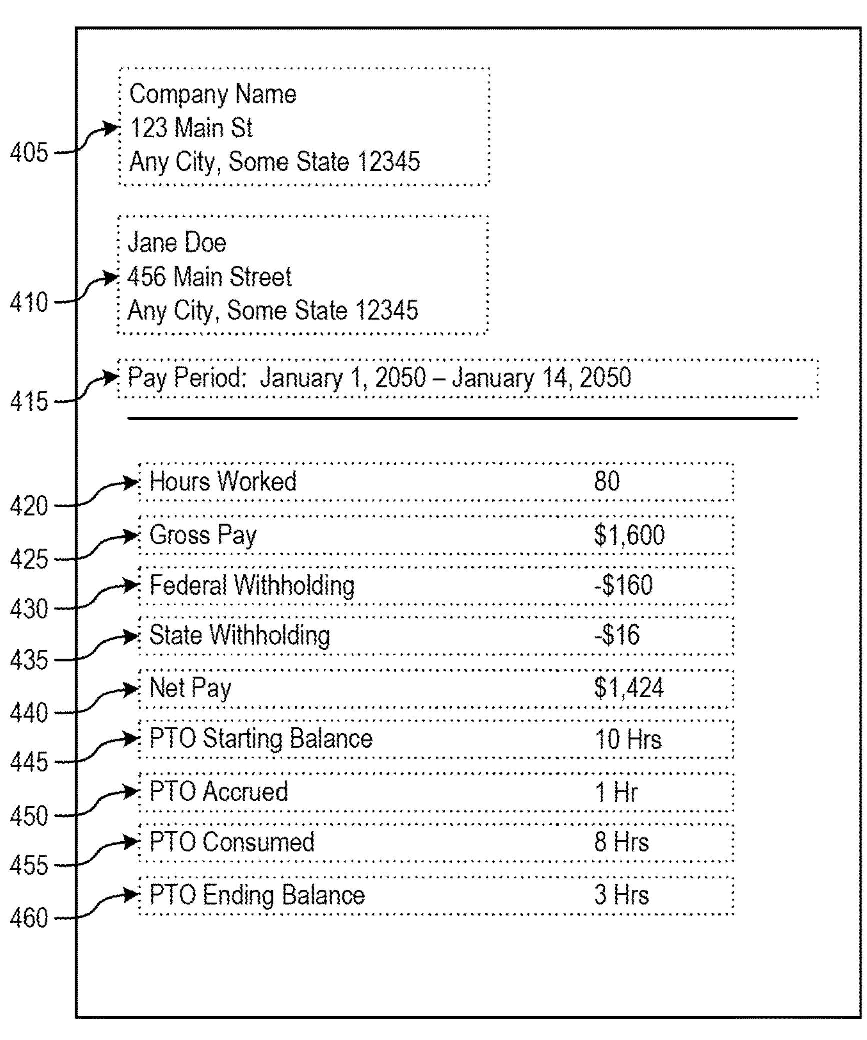
FIG. 4 depicts an example data file, according to one or more aspects of the technical solutions described herein.

FIG. 4 depicts an example data file, according to one or more aspects of the technical solutions described herein. The example data file includes an image 400. The image 400 is associated with a statement, such as a pay statement as depicted. The image 400 includes one or more sections 405-460. The sections 405-460 include values which can be extracted by the computing system into data. In some aspects, the computing system assigns a label for each section 405-460 of the image 400.

FIG. 5 depicts an example data file 500, according to one or more aspects of the technical solutions described herein. The data file can be the data file 170 of FIG. 1. The example data file 500 can be an image 501, among other file types. The image 501 can include one or more sections 505. In some aspects, the computing system determines a location and a label for each section 505 of the image 501.

The data file 500 is any set of data aggregated, accumulated, calculated, generated, or otherwise available to an entity. In some aspects, the data file 500 is or includes one or more digital images. The digital images (hereinafter sometimes referred to as the images) include documents, pictures, or photos, among others, which include or convey information. In some aspects, each digital image corresponds to one or more statements. The statements include pay statements. A pay statement is document or grouping of documents which include information related to a pay rate, wage, taxes, salary, or deductions for an individual employed by an entity. The digital images of the data file 500 conveys information, such as information relate to an entity or employees of an entity.

In some aspects, the data file 500 includes information about one or more entities. The entity includes an individual, such as an employee of an organization as described herein, or a grouping of people, such as an organization, corporation, or educational institution. The information includes data like name, address, social security number, salary, personally identifying information, demographic information, familial information, tax information, benefits information, or other such information. In some aspects, the data file 500 includes information about an entity such as location of the entity (e.g., an address, physical or coordinate location, a geofence associated with the entity), employees of the entity, tax information, financial information, proprietary information, among other information. For example, a source, such as the source 110A of FIG. 1, is an external computing system maintaining a data repository of the pay statements for government employees in a specific county. In this example, each collection of the pay statements can be the data file 500.

A source transmits, to a computing system via a network, the data file 500. The source can be the source 110A of FIG. 1. The network can be the network 101 of FIG. 1. In some aspects, the source transmits the data file 500 to a computing system, responsive to a request from the computing system, periodically, or as part of a system transfer. The computing system can be the computing system 105 of FIG. 1. In some aspects, the data file 500 is in a format corresponding to a source, such as the source 110A of FIG. 1. For example, the source arranges values of the data file 500 in a specified manner, such as a table, list or other defined data structure. The source can include different values within the images of the data file 500. For example, the source can maintain a data file 500 corresponding to demographics of library card holders. The source can maintain a data file 500 corresponding to pay statements for employees of the Department of Transportation. The values for the data file 500 corresponding to library card holders can have different values and/or arrangements than the data file 500 corresponding to pay statements for employees of the Department of Transportation.

The data file 500 include a plurality of values. The values can be alpha-numeric. In some cases, the values are displayable on a screen, such as that of a client device, a source, or a computing system. The client device can be the client device 125 of FIG. 1. The source can be the source 110 of FIG. 1. The computing system can be the computing system 125 of FIG. 1. For example, the data file 500 includes strings of text such as "First Name" or "Earnings" or "130,000" or "0.60." The data file 500 includes auditory values, such as a sound or vocal recording. The data file 500 includes colored or color-coded values. In some aspects, the data file 500 includes time-related values, such as a current time, elapsed time, clock-in time, among others. In some aspects, the data file 500 includes images. The values stored in the data file 500 can include any combination of types of values. For example, a first value of the data file 500 includes a string embedded within an image of the data file 500. In some aspects, the values stored in the data file 500 relate to each other. In an example, a value of "Earnings" depicted in an image of the data file 500 corresponds to a value of "4,657." Some values of the data file 500 can be null or zero values.

The data file 500 stores data using a variety of formats. In some aspects, the values and the images of the data file 500 are arranged in a table, as a list, as a figure, or a combination thereof, among others. The formats can correspond to at least different attributes, sheets, arrangements, included values, or layouts of the data file 500 as described herein. Arrangements or layouts of the data file 500 includes sections 505. In some aspects, each section 505 is a different physical display arrangement of the values within each image of the data file 500. An image of the data file 500 includes one or more sections 505. In some aspects, each section 505 includes a location and a label. The location of the section 505 refers to a spatial perimeter or point where the section 505 is found within the image. The label identifies the section 505 based on values in the image. Arrangements of sections within each image can be referred to as a layout of the data file 500.

The data file 500 includes images. In some aspects, the images include separate sections of the data file 500. For example, the data file 500 can be payroll information for an entity. A first image of the data file 500 includes, displays, stores or otherwise presents values from A-K. A second image of the data file 500 includes values of the data file from L-Z. For example, a first image relates to a pay statement for a first employee of an entity and a second image of the data file 500 relates to a pay statement for a second employee of the entity. In some aspects, each image of the data file 500 includes different values, arrangements, sections, labels, or locations. In some aspects, values, arrangements, sections, labels, or locations can repeat between the images of the data file 500. The data file 500 can have any number of images. For example, the data file 500 includes one image, 1000 images, or no images. In some aspects, the images correspond to physical paper sheets, tabs of a file such as on a spreadsheet, or other sheets, such as a pay statement. In some aspects, each image includes a different layout or the same layout. In some aspects, the images of the data file 500 can conform to the same file type and vendor type.

The data file 500 includes different attributes, such as a file type, data type, vendor type, or other such attributes. The data file 500 is included in, denoted by, or transmitted as an electronic file type (hereinafter sometimes referred to as the file type). Examples of electronic file types include comma separated values (CSV), portable document files (PDF), Joint Photographic Experts Group files (JPEG), portable network graphics (PNG), Excel files (XLS or XLSM), data interchange format (DIF), JavaScript Object Notation (JSON), among others. The data file 500 is associated with or stored as a file type. The file type determines or relates to data structures associated with the data file 500. In some aspects of the technical solutions described herein, the data file 500 is encrypted by a source, such as the source 110 of FIG. 1. For example, the source can be Advanced Encryption Standard (AES), Rivest-Shamir-Adleman (RSA), or another encryption standard. The data file 500 can be unencrypted by the source, or by another system enabled for access to the data file 500, such as a computing system. The computing system can be the computing system 105 of FIG. 1.

The data type of the data file 500 refers to a type of value within the data file 500. The data file 500 includes, in some aspects of the technical solutions described herein, more than one data type within the data file 500. In some cases, a data type corresponds to an image of the data file 500, or one or more data types occur or are included in one or more images of the data file 500. The data type includes indicative, non-indicative, master data, salary data, personal data, balance data, deductions data, or other types of data. In some aspects, a data type is assigned, imported, generated, or otherwise created by the computing system, such as the computing system 105 of FIG. 1, or a user operating through the computing system. Indicative data includes pairs of data values such as "EMPLOYEE NAME" and "JOHN SMITH" or "FIRST NAME" and "MARY." Non-indicative data includes data types such as master data, earnings data, tax data, balance data, or deductions data. Master data includes values of the data file 500 relating to an entity, such as a company identification number, a company name, or a listing of company employees. Balance data includes values of the data file 500 related to balancing numbers, such as budget hours, a checking account, or project hours. Earnings data includes values of the data file 500 related to profits, revenue, income, or expenditure of a company or individual. Tax data includes values of the data file 500 related to income tax, social security tax, sales tax, or other tax related values for an individual, group of individuals, or a company.

In some aspects, a data type defines more than one value. In some aspects, a data type is defined for pairs of values, columns of values, rows of values, or other corresponding values. A grouping of values of a first data type includes subsets of the grouping of values which also correspond to a second data type. For example, a set of values of the data file 500 corresponds to a master data type. Within the master data type, there can be pairings of values which correspond to an indicative data type. In short, in some aspects a data type classifies or groups together corresponding values of the data file 500.

In some aspects, the data file 500 includes a vendor type. A vendor type is related to a source or a client device. The source can be the source 110 of FIG. 1. The client device can be the client life 125 of FIG. 1. For example, a first source corresponds to Company A. Company A presents, stores, or otherwise maintains the data file 500 in a predefined or predictable manner, such as with recurring layouts, data types, or images. In some cases, the data file 500 identifies, is identified by, or provides an indication of the vendor type to a computing system, such as the computing system 105 of FIG. 1.

FIG. 6 depicts an example data file, according to one or more aspects of the technical solutions described herein. The example data file of FIG. 6 includes image 600. The image 600 is associated with a statement, such as a pay statement as depicted herein. The image 600 includes one or more sections corresponding to a location and a label.

FIG. 7 depicts an example spreadsheet 700, according to one or more aspects of the technical solutions described herein. In some aspects, the computing system generates the spreadsheet 700 responsive to determining incompatibilities of one or more sections of a data file, such as the data files depicted in FIGS. 4-6. The spreadsheet 700 includes information 705-725 and metrics 730. The metrics 730 includes probabilities of incompatibilities being erroneously detected for varying types of incompatibilities.

Figure 8:
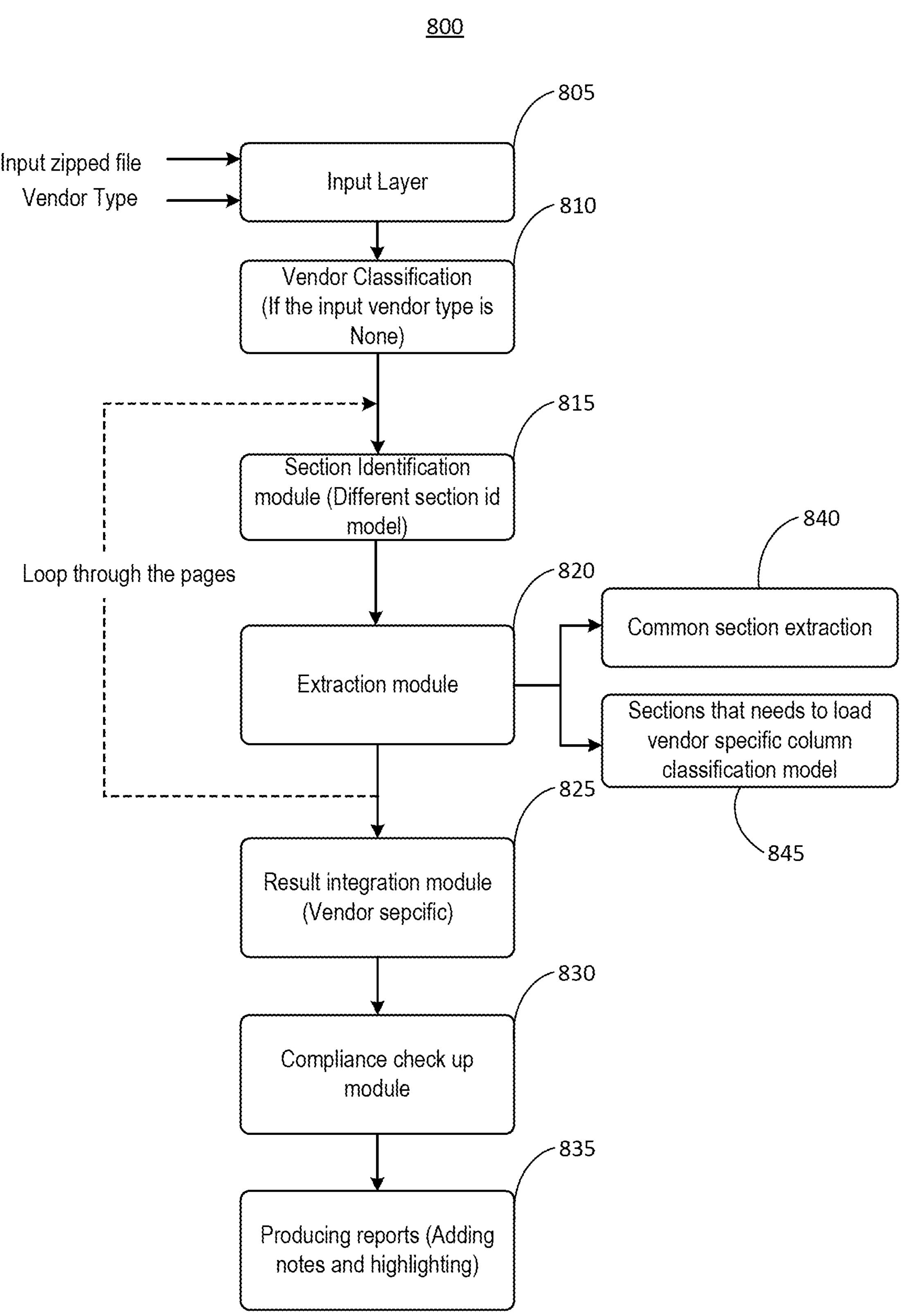
FIG. 8 depicts an example method for automatic compliance via custom integrated machine learning models.

FIG. 8 depicts an example method for automatic compliance via custom integrated machine learning models. The method 800 is performed by one or more systems or components depicted in FIG. 1, FIG. 10, or FIG. 11, including, for example, a computing system, client device, or data repository. The method includes ATS 805-845, performable by the one or more systems or components in any order or sequence.

At ACT 805, the computing system receives an input zipped file and a vendor type. In some aspects, the computing system does not receive a vendor type. In some aspects, the computing system receives the input zipped file as a data file including a plurality of images corresponding to statements. At ACT 810, the computing system performs vendor classification. In some aspects, the computing system performs vendor classification responsive to receiving the input zipped file but not receiving a vendor type. In some aspects, vendor classification includes determining a type of the statements. In some aspects, the computing system does not perform vendor classification, responsive to a determination that the data file includes an input identifying the vendor type.

At ACT 815, the computing system executes a section identification module. In some aspects, the computing system executes the section identification module responsive to performing vendor classification. The section identification module identifies a difference machine learning model to identify sections, labels, and locations of the input zipped file based on the vendor classification. The section identification module determines locations and labels for each section in a digital image of the input zipped file.

At ACT 820, the computing system executes an extraction module. In some aspects, the computing system executes the extraction module responsive to determining the location and labels for each section of a digital image of the input zipped file. The computing system executes the extraction module to extract the information from the one or more sections. In some aspects, the ACT 820 includes the ACTS 840 and/or the 845. At ACT 840, the computing system performs common section extraction. In some aspects, the computing system performs common section extraction responsive to a determination that one or more labels of the sections of the image correspond to a library of labels maintained by the computing system. At ACT 845, the computing system performs data extraction for sections that include vendor specific columns using a column classification module. In some aspects, the computing system performs ACT 845 responsive to a determination that one or more labels corresponding to sections of the digital image do not match with a library of labels.

Responsive to performing the extraction module, the computing system 105 loops through each page (e.g., digital image) of the input zipped file. In some aspects, looping through each page refers to performing section identification and information extraction for each section of each digital image of the input zipped file. Upon extracting all information from the input zipped file, the computing system proceed to ACT 825.

At ACT 825, the computing system performs a result integration module. In some aspects, the result integration module determines one or more information thresholds by which to check the extracted information for compliance. At ACT 830, the computing system executes a compliance check up module. In some aspects, the computing system executes the compliance check up module responsive to executing the result integration module. In some aspects, the compliance check up module performs one or more of the functionalities of the compliance validator 160. In some aspects, the compliance check up module determines one or more incompatibilities with a procedure by comparing the extracted information to the threshold information for the procedure.

At ACT 835, the computing system produces reports. In some aspects, the computing system produces reports responsive to executing the compliance check up module. In some aspects, the reports produced by the computing system includes notifications or indications of the incompatibilities within the input zipped file. For example, the reports include notes, annotations, highlighting, or other marks to indicate the incompatibilities with the procedure.

Figure 9:
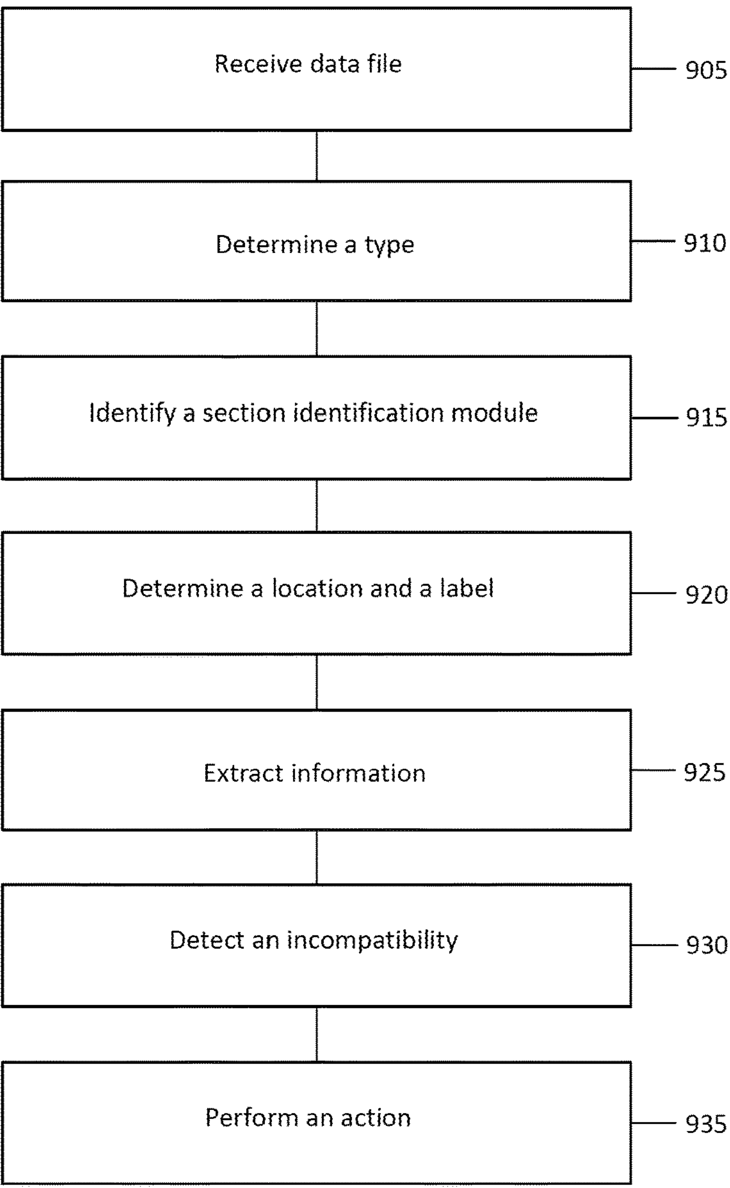
FIG. 9 depicts an example method for automatic compliance via custom integrated machine learning models.

FIG. 9 depicts a method 900 for automatic compliance via custom integrated machine learning models according to one or more aspects of the technical solutions described herein. The method includes the acts 905-935. The method 900 is performed by one or more systems or components depicted in FIG. 1, FIG. 10, or FIG. 11, including, for example, a computing system. At ACT 905, the computing system receives a data file. The data file includes one or more digital images. The one or more digital images correspond to one or more statements.

At ACT 910, the computing system determines a type. In some aspects, the computing system determines a type responsive to receiving the data file. In some aspects, the computing system determines a type of the statement. In some aspects, a type of the statement includes a vendor type, a data type, among others described herein. For example, the computing system determines an entity associated with the statement of the data file.

At ACT 915, the computing system identifies a section identification module. In some aspects, the computing system identifies a section identification module responsive to determining a type of the statements. In some aspects, the computing system identifies the section identification module as a machine learning model trained to determine locations and labels of sections within one or more digital images of the data file. In some aspects, the section identification module is a machine learning model trained using a type of pay statement and annotated sections of historical pay statements. In some aspects, the computing system selects the section identification module from a plurality of machine learning models based on the type of the pay statements and/or the annotated sections of historical pay statements.

At ACT 920, the computing system determines a location and a label. The computing system determines a location and a label associated with a section of a digital image of the data file. In some aspects, the computing system determines the location and the label responsive to identifying the section identification module. In some aspects, the computing system determines the location as a bounding box, set of coordinates, or distance relative to other features of the digital image. In some aspects, the computing system determines the label based on a classification of text contained within the identified section.

At ACT 925, the computing system extracts information. The computing system extracts information from the section based on the location and label of the section. In some aspects, the computing system extracts the information responsive to the determination of a location and label for the section. In some aspects, the computing system provides the location and label as input to a machine learning model to extract the information.

At ACT 930, the computing system detects a non-compliance. In some aspects, the computing system detects the non-compliance responsive to extracting the information for the section. In some aspects, the computing system detects the non-compliance as a non-compliance with a procedure. In some aspects, the computing system detects the non-compliance by comparing the extracted information with threshold information for the procedure.

At ACT 935, the computing system performs an action. In some aspects, the computing system performs the action responsive to detecting a non-compliance. In some aspects, the action includes providing a notification of the non-compliance. In some aspects, the action includes generating and transmitting a report including the extracted information. In some aspects, the action includes generating a data structure including the extracted information.

Figure 10:
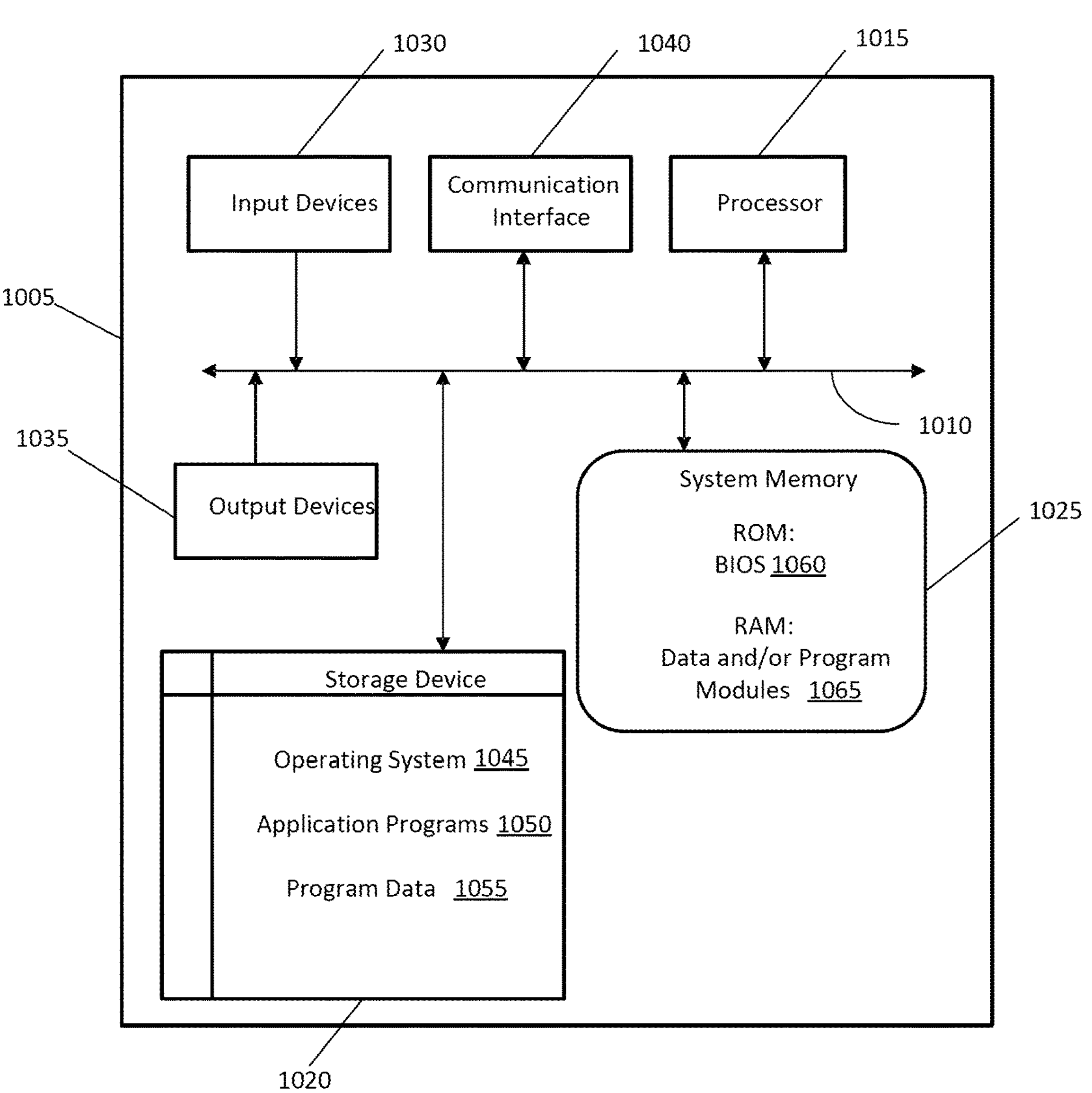
FIG. 10 depicts an illustrative architecture of a computing system implemented in embodiments of the technical solutions described herein.

FIG. 10 is an illustrative architecture of a computing system 1000 that implements one or more aspects described herein. The computing system 1000 is only one example of a suitable computing system and is not intended to suggest any limitation as to the scope of use or functionality of the technical solutions described herein. Also, computing system 1000 should not be interpreted as having any dependency or requirement relating to any one or combination of components illustrated in computing system 1000.

Figure 11:
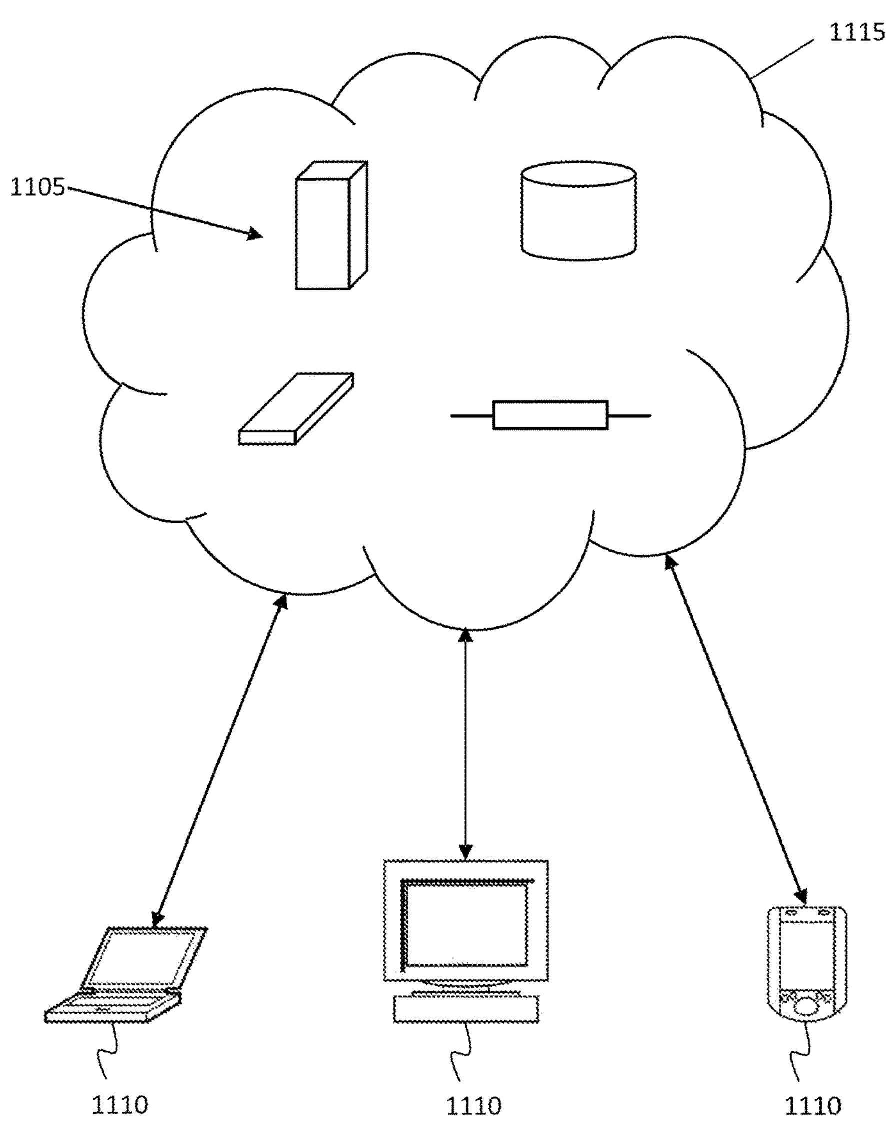
FIG. 11 shows an exemplary cloud computing environment in accordance with aspects of the technical solutions described herein.

As shown in FIG. 10, computing system 1000 includes a computing device 1005. The computing device 1005 can be resident on a network infrastructure such as within a cloud environment as shown in FIG. 11 or can be a separate independent computing device (e.g., a computing device of a third party service provider). The computing device 1005 includes a bus 1010, a processor 1015, a storage device 1020, a system memory (hardware device) 1025, one or more input devices 1030, one or more output devices 1035, and a communication interface 1040.

The bus 1010 permits communication among the components of computing device 1005. For example, bus 1010 can be any of several types of bus structures including a memory bus or memory controller, a peripheral bus, and a local bus using any of a variety of bus architectures to provide one or more wired or wireless communication links or paths for transferring data and/or power to, from, or between various other components of computing device 1005.

The processor 1015 is one or more processors or processors that include any processing circuitry operative to interpret and execute computer readable program instructions, such as program instructions for controlling the operation and performance of one or more of the various other components of computing device 1005. In aspects of the technical solutions described herein, processor 1015 interprets and executes the processes, steps, functions, and/or operations of aspects of the technical solutions described herein, which can be operatively implemented by the computer readable program instructions.

For example, processor 1015 provides an enterprise-wide security approach with all stakeholders (e.g., Dev teams, leadership, CSO office, etc.) with a set of various security scanner types and information sources integrated into a single tool. In aspects of the technical solutions described herein, the processor 1005 uniformly integrates or packages existing scanner types into a single tool that standardizes and visually displays the output over different development teams for different scanner types. The scanner types which are packaged into the integrated security tool can capture specific requirements of the different teams, i.e., ensures that the tools support varied team development methodologies and different tech stacks to capture required security vulnerabilities. The processor 1015 also establishes a regular feedback mechanism and can be used to develop a process for remediation timelines and priority including at risk vulnerabilities. In aspects of the technical solutions described herein, processor 1015 receives input signals from one or more input devices 1030 and/or drive output signals through one or more output devices 1035. The input devices 1030 are, for example, a keyboard, touch sensitive user interface (UI), etc. The output devices 1035 are, for example, any display device, printer, etc.

The storage device 1020 includes removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 1005 in accordance with the different aspects of the technical solutions described herein. In aspects of the technical solutions described herein, storage device 1020 stores operating system 1045, application programs 1050, and program data 1055 in accordance with aspects of the technical solutions described herein.

The system memory 1025 includes one or more storage mediums, including for example, non-transitory media such as flash memory, permanent memory such as read-only memory ("ROM"), semi-permanent memory such as random access memory ("RAM"), any other suitable type of storage component, or any combination thereof. In some aspects of the technical solutions described herein, an input/output system 1060 (BIOS) including the basic routines that help to transfer information between the various other components of computing device 1005, such as during start-up, can be stored in the ROM. Additionally, data and/or program modules 1065, such as at least a portion of operating system 1045, application programs 1050, and/or program data 1055, that are accessible to and/or presently being operated on by processor 615 can be contained in the RAM.

The communication interface 1040 includes any transceiver-like mechanism (e.g., a network interface, a network adapter, a modem, or combinations thereof) that enables computing device 1005 to communicate with remote devices or systems, such as a mobile device or other computing devices such as, for example, a server in a networked environment, e.g., cloud environment. For example, computing device 1005 is connected to remote devices or systems via one or more local area networks (LAN) and/or one or more wide area networks (WAN) using communication interface 1040.

As discussed herein, computing system 1000 are configured to integrate different scanner types into a single workbench or tool. This allows developers and other team members a uniform approach to assessing security vulnerabilities in a code throughout the enterprise. In particular, computing device 1005 performs tasks (e.g., process, steps, methods and/or functionality) in response to processor 1015 executing program instructions contained in a computer readable medium, such as system memory 1025. The program instructions are read into system memory 1025 from another computer readable medium, such as data storage device 1020, or from another device via the communication interface 1040 or server within or outside of a cloud environment. In aspects of the technical solutions described herein, an operator can interact with computing device 1005 via the one or more input devices 1030 and/or the one or more output devices 1035 to facilitate performance of the tasks and/or realize the end results of such tasks in accordance with aspects of the technical solutions described herein. Hardwired circuitry can be used in place of or in combination with the program instructions to implement the tasks, e.g., steps, methods and/or functionality, consistent with the different aspects of the technical solutions described herein. Thus, the steps, methods and/or functionality described herein are implemented in any combination of hardware circuitry and software.

FIG. 11 shows an exemplary cloud computing environment 1100 in accordance with aspects of the technical solutions described herein. In aspects of the technical solutions described herein, one or more aspects, functions and/or processes described herein is performed and/or provided via cloud computing environment 1100. As depicted in FIG. 11, cloud computing environment 1100 includes cloud resources 1105 that are made available to client devices 1110 via a network 1115, such as the Internet. In some aspects, cloud resources 1105 are on a single network or a distributed network. In some aspects, cloud resources 1105 are distributed across multiple cloud computing systems and/or individual network enabled computing devices. Cloud resources 1105 include a variety of hardware and/or software computing resources, such as servers, databases, storage, networks, applications, and platforms that perform the functions provided herein including storing code, running scanner types and provided an integration of plural scanner types into a uniform and standardized application, e.g., display.

Client devices 1110 comprise any suitable type of network-enabled computing device, such as servers, desktop computers, laptop computers, handheld computers (e.g., smartphones, tablet computers), set top boxes, and network-enabled hard drives. Cloud resources 1105 are typically provided and maintained by a service provider so that a client does not need to maintain resources on a local client device 1110. In aspects of the technical solutions described herein, cloud resources 1105 include one or more computing system 1000 of FIG. 10 that is specifically adapted to perform one or more of the functions and/or processes described herein.

Cloud computing environment 1100 is configured such that cloud resources 1105 provide computing resources to client devices 1110 through a variety of service models, such as Software as a Service (SaaS), Platforms as a service (PaaS), Infrastructure as a Service (IaaS), and/or any other cloud service models. Cloud resources 1105 are configured, in some cases, to provide multiple service models to a client device 1110. For example, cloud resources 1105 provide both SaaS and IaaS to a client device 1110. Cloud resources 1105 are configured, in some cases, to provide different service models to different client devices 1110. For example, cloud resources 1105 provide SaaS to a first client device 1110 and PaaS to a second client device 1110.

Cloud computing environment 1100 is configured such that cloud resources 1105 provide computing resources to client devices 1110 through a variety of deployment models, such as public, private, community, hybrid, and/or any other cloud deployment model. Cloud resources 1105 are configured, in some cases, to support multiple deployment models. For example, cloud resources 1105 provide one set of computing resources through a public deployment model and another set of computing resources through a private deployment model.

In aspects of the technical solutions described herein, software and/or hardware that performs one or more of the aspects, functions and/or processes described herein can be accessed and/or utilized by a client (e.g., an enterprise or an end user) as one or more of a SaaS, PaaS and Iaas model in one or more of a private, community, public, and hybrid cloud. Moreover, although aspects of the technical solutions described herein include a description of cloud computing, the systems and methods described herein are not limited to cloud computing and instead can be implemented on any suitable computing environment.

Cloud resources 1105 are configured to provide a variety of functionality that involves user interaction. Accordingly, a user interface (UI) is provided for communicating with cloud resources 1105 and/or performing tasks associated with cloud resources 1105. The UI is accessed via a client device 1110 in communication with cloud resources 1105. The UI is configured to operate in a variety of client modes, including a fat client mode, a thin client mode, or a hybrid client mode, depending on the storage and processing capabilities of cloud resources 1105 and/or client device 1110. Therefore, a UI is be implemented as a standalone application operating at the client device in some aspects of the technical solutions described herein. In other aspects, a web browser-based portal is used to provide the UI. Any other configuration to access cloud resources 1105 can also be used in various implementations.

The foregoing examples have been provided merely for the purpose of explanation and are in no way to be construed as limiting of the technical solutions described herein. While aspects of the technical solutions described herein have been described with reference to an exemplary embodiment, it is understood that the words which have been used herein are words of description and illustration, rather than words of limitation. Changes can be made, within the purview of the appended claims, as presently stated and as amended, without departing from the scope and spirit of aspects of the technical solutions described herein. Although aspects of the technical solutions have been described herein with reference to particular means, materials and embodiments, the technical solutions described herein are not intended to be limited to the particulars described herein; rather, the technical solutions described herein extend to all functionally equivalent structures, methods and uses, such as are within the scope of the appended claims.

Although an example computing system has been described in FIG. 9, the subject matter including the operations described in this specification can be implemented in other types of digital electronic circuitry, or in computer software, firmware, or hardware, including the structures described in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

The subject matter and the operations described in this specification can be implemented in digital electronic circuitry, or in computer software, firmware, or hardware, including the structures described in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. The program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently described systems or methods, their components, acts, or elements to single or plural configurations. References to any act or element being based on any information, act or element may include implementations where the act or element is based at least in part on any information, act, or element.

Any implementation described herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations described herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence has any limiting effect on the scope of any claim elements.

Modifications of described elements and acts such as substitutions, changes and omissions can be made in the design, operating conditions and arrangement of the described elements and operations without departing from the scope of the technical solutions described herein.

References to "approximately," "substantially", or other terms of degree include variations of +/−10% from the given measurement, unit, or range unless explicitly indicated otherwise. Coupled elements can be electrically, mechanically, or physically coupled with one another directly or with intervening elements. Scope of the Systems and methods described herein is thus indicated by the appended claims, rather than the foregoing description, and changes that come within the meaning and range of equivalency of the claims are embraced therein.

What is claimed is:

1. A system, comprising:

one or more processors, coupled with memory, to:

receive a data file comprising a plurality of digital images respectively corresponding to a plurality of statements;

determine, using one or more machine learning models, a type of a first pay statement of the plurality of statements in the data file;

identify a section identification model trained with machine learning relating to annotated statements with labeled sections for the type of the first pay statement;

determine, using the section identification model, a location and a label of a predetermined section in a first digital image of the first pay statement based on the type of the first pay statement;

extract, based on the location and the label of the predetermined section, information from the first digital image;

detect, based on a comparison of the extracted information with threshold information established for the label, a non-compliance with a procedure; and perform an action responsive to detection of the non-compliance with the procedure.

2. The system of claim 1, wherein to determine the location, the one or more processors are further configured to:

determine coordinates in the first digital image corresponding to the predetermined section.

3. The system of claim 1, wherein the one or more processors are further configured to:

construct a data structure comprising the extracted information from the first digital image; and annotate the extracted information in the data structure with the label.

4. The system of claim 1, wherein to extract the information, the one or more processors are further configured to:

use a support vector machine to identify a column in the predetermined section; and extract the information based on the identified column.

5. The system of claim 1, wherein to detect the non-compliance, the one or more processors are further configured to:

detect an erroneous value in the extracted information.

6. The system of claim 1, wherein to detect the non-compliance, the one or more processors are further configured to:

determine a missing value in the extracted information.

7. The system of claim 1, wherein the one or more processors are further configured to:

extract second information from a second section at a second location in the first image having a second label; and determine the non-compliance based on the extracted second information.

8. The system of claim 1, wherein to detect the non-compliance, the one or more processors are further configured to:

select the threshold information for the procedure based on the type of the plurality of statements and a geographic location relating to the first statement.

9. The system of claim 1, wherein to detect the non-compliance, the one or more processors are further configured to:

select the threshold information for the procedure based on at least one of a date of the first statement, a region code of the first statement, or a company code of the first statement.

10. The system of claim 1, wherein to perform the action, the one or more processors are further configured to:

provide, for display, a notification of the non-compliance.

11. The system of claim 1, wherein to perform the action, the one or more processors are further configured to:

generate a spreadsheet comprising an indication of the first statement or the predetermined section with the non-compliance.

12. The system of claim 1, wherein the one or more processors are further configured to:

generate a metric indicative of a level of compatibility of the plurality of statements.

13. A method, comprising:

receiving, by one or more processors coupled with memory, a data file comprising a plurality of digital images respectively corresponding to a plurality of statements;

determining, by the one or more processors, using one or more machine learning models, a type of the plurality of statements;

identifying, by the one or more processors, a section identification model trained with machine learning relating to annotated statements with labeled sections for the type of the first pay statement;

determining, by the one or more processors using the section identification model, a location and a label of a predetermined section in a first digital image of the plurality of digital images corresponding to a first statement of the plurality of statements;

extracting, by the one or more processors based on the location and the label of the predetermined section, information from the first digital image;

detecting, by the one or more processors, based on a comparison of the extracted information with threshold information established for the label, a non-compliance with a procedure; and performing, by the one or more processors, an action responsive to detection of the non-compliance with the procedure.

14. The method of claim 13, wherein determining the location comprises:

determining, by the one or more processors, coordinates in the first digital image corresponding to the predetermined section.

15. The method of claim 13, comprising:

constructing, by the one or more processors, a data structure comprising the extracted information from the first digital image; and annotating, by the one or more processors, the extracted information in the data structure with the label.

16. The method of claim 13, wherein detecting the non-compliance comprises:

determining, by the one or more processors, a missing value in the extracted information.

17. The method of claim 13, wherein detecting the non-compliance comprises:

selecting, by the one or more processors, the threshold information for the procedure based on the type of the plurality of statements and a geographic location relating to the first statement.

18. The method of claim 13, comprising:

generating, by the one or more processors, a metric indicative of a level of compatibility of the plurality of statements.

19. A non-transitory computer-readable medium storing processor executable instructions, that upon execution by one or more processors, cause the one or more processors to:

receive a data file comprising a plurality of digital images respectively corresponding to a plurality of statements;

determine, using one or more machine learning models, a type of the plurality of statements;

determine, using a section identification model, a location and a label of a section in a first digital image of the plurality of digital images corresponding to a first statement of the plurality of statements;

extract, based on the location and the label of the section, information from the first digital image;

detect, based on a comparison of the extracted information with threshold information established for the label, a non-compliance with a procedure; and perform an action responsive to detection of the non-compliance with the procedure.

20. The non-transitory computer-readable medium of claim 19, wherein the instructions, upon execution, further cause the one or more processors to:

determine coordinates in the first digital image corresponding to the section.

* * * * *